US012621089B2

(12) United States Patent
Beale et al.

(10) Patent No.: US 12,621,089 B2
(45) Date of Patent: May 5, 2026

(54) METHODS, COMMUNICATIONS DEVICES, AND INFRASTRUCTURE EQUIPMENT

(71) Applicant: Sony Group Corporation, Tokyo (JP)

(72) Inventors: Martin Warwick Beale, Basingstoke (GB); Shin Horng Wong, Basingstoke (GB); Naoki Kusashima, Tokyo (JP); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 392 days.

(21) Appl. No.: 18/030,074

(22) PCT Filed: Oct. 5, 2021

(86) PCT No.: PCT/EP2021/077441
§ 371 (c)(1),
(2) Date: Apr. 4, 2023

(87) PCT Pub. No.: WO2022/078819
PCT Pub. Date: Apr. 21, 2022

(65) Prior Publication Data
US 2023/0336286 A1      Oct. 19, 2023

(30) Foreign Application Priority Data

Oct. 16, 2020    (EP) ..................................... 20202427

(51) Int. Cl.
*H04L 1/1867*          (2023.01)
*H04W 72/1268*          (2023.01)
(52) U.S. Cl.
CPC ......... *H04L 1/189* (2013.01); *H04W 72/1268* (2013.01)
(58) Field of Classification Search
None
See application file for complete search history.

(56) References Cited

U.S. PATENT DOCUMENTS

2020/0260391 A1*   8/2020   Zhou ................... H04W 52/281
2020/0351867 A1*  11/2020   Guo ...................... H04L 5/0051
(Continued)

FOREIGN PATENT DOCUMENTS

WO        2022/018230 A1     1/2022

OTHER PUBLICATIONS

International Search Report and Written Opinion mailed on Jan. 21, 2022, received for PCT Application PCT/EP2021/077441, Filed on Oct. 5, 2021, 9 pages.
(Continued)

*Primary Examiner* — Lonnie V Sweet
(74) *Attorney, Agent, or Firm* — XSENSUS, LLP

(57)        ABSTRACT

A method includes operating in accordance with a configured grant, CG, mode of operation, the CG mode of operation comprising determining a sequence of instances of uplink communications resources of the wireless access interface and transmitting signals to the wireless communications network in at least one instance of the sequence of instances of uplink communications resources of the wireless access interface, transmitting uplink data to the wireless communications network in two or more instances of the sequence of instances of uplink communications resources of the wireless access interface as a plurality of repetitions of the uplink data, and transmitting one or more of a plurality of versions of uplink control information, CG-UCI, to the wireless communications network, each version of CG-UCI being associated with a plurality of instances of the sequence of instances of uplink communications resources of the wireless access interface.

19 Claims, 19 Drawing Sheets

(56) References Cited

U.S. PATENT DOCUMENTS

| | | | | |
|---|---|---|---|---|
| 2021/0105812 A1* | 4/2021 | Rastegardoost | ...... | H04L 1/1671 |
| 2021/0298049 A1* | 9/2021 | Myung | ............. | H04W 72/1268 |
| 2022/0070910 A1* | 3/2022 | Li | ......................... | H04W 72/23 |
| 2022/0174699 A1* | 6/2022 | El Hamss | ......... | H04W 72/1268 |
| 2022/0295474 A1* | 9/2022 | Nunome | ................... | H04L 1/18 |
| 2022/0353698 A1* | 11/2022 | Jang | ...................... | H04L 5/0053 |
| 2023/0008664 A1* | 1/2023 | Matsumura | ........... | H04W 72/21 |
| 2023/0052620 A1* | 2/2023 | Lei | ........................ | H04L 5/0053 |
| 2023/0138449 A1* | 5/2023 | Khoshnevisan | ...... | H04W 72/21 370/329 |
| 2023/0217447 A1* | 7/2023 | Guo | ...................... | H04W 72/21 370/329 |
| 2023/0261789 A1* | 8/2023 | Lei | ........................... | H04L 1/08 370/329 |

OTHER PUBLICATIONS

Nokia et al., "Revised WID: Enhanced Industrial Internet of Things (IoT) and Ultra-Reliable and Low Latency Communication (URLLC) Support for NR", 3GPP TSG RAN Meeting #88e, RP-201310, Jun. 29-Jul. 3, 2020, 6 pages.

Holma et al., "LTE for UMTS OFDMA and SC-FDMA Based Radio Access", John Wiley & Sons, 2009, pp. 25-27.

Huawei et al., "PUSCH Enhancements for URLLC", 3GPP TSG RAN WG1 Ad-Hoc Meeting 1901, R1-1900046, Jan. 21-25, 2019, 11 pages.

Fraunhofer IIS, "On Support of UL Grantfree Transmission", 3GPP TSG RAN WG1 Meeting AH1901, R1-1901233, Jan. 21-25, 2019, 5 pages.

Oppo, "Discussion on the Remaining Issues of Configured Grant Enhancements", 3GPP TSG RAN WG1 #100bis-E, R1-2001762, Apr. 20-May 1, 2020, 4 pages.

Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.

Qualcomm Inc., "Revised WID on NR-based Access to Unlicensed Spectrum", 3GPP TSG RAN Meeting #84, RP-191575, Jun. 3-6, 2019, 8 pages.

3GPP, "Medium Access Control (MAC) Protocol Specification (Release 16)", 3GPP TS 38.321 V16.1.0, Jul. 2020, 151 pages.

3Gpp, "Multiplexing and Channel Coding (Release 16)", 3GPP TS 38.212 V16.1.0, Mar. 2020, 146 pages.

3GPP, "Study on Scenarios and Requirements for Next Generation Access Technologies (Release 14)", 3GPP TR 38.913 V14.3.0, Jun. 2017, 39 pages.

* cited by examiner

Contention Window

Transmission Occasion    PUSCH

CG Period with *K*=4 repetitions

Slot *n*    Slot *n*+1    Slot *n*+2    Slot *n*+3

RV0    RV3    RV0    RV3

UL Data arrives
at buffer 2 out of 4 repetitions
transmitted

CG-UCI repetitions
transmitted within
PUSCH repetitions

METHODS, COMMUNICATIONS DEVICES, AND INFRASTRUCTURE EQUIPMENT

CROSS-REFERENCE TO RELATED APPLICATIONS

The present application is based on PCT filing PCT/EP2021/077441, filed Oct. 5, 2021, which claims priority to European patent application 20202427.9, filed Oct. 16, 2020, the contents of each of which are hereby incorporated by reference.

BACKGROUND

Field of Disclosure

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever increasing range of devices associated with a wider range of data traffic profiles and types than existing systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device configured to transmit data to a wireless communications network via a wireless access interface. The method comprises operating in accordance with a configured grant, CG, mode of operation, the CG mode of operation comprising determining a sequence of instances of uplink communications resources of the wireless access interface and transmitting signals to the wireless communications network in at least one instance of the sequence of instances of uplink communications resources of the wireless access interface, transmitting uplink data to the wireless communications network in two or more instances of the sequence of instances of uplink communications resources of the wireless access interface as a plurality of repetitions of the uplink data, and transmitting one or more of a plurality of versions of uplink control information, CG-UCI, to the wireless communications network, each version of CG-UCI being associated with a plurality of instances of the sequence of instances of uplink communications resources of the wireless access interface. Here, the one or more transmitted versions of CG-UCI are each repeated a plurality of times during the transmission of the uplink data.

Some further embodiments of the present technique can provide a method of operating a communications device configured to transmit data to a wireless communications network via a wireless access interface. The method comprises operating in accordance with a configured grant, CG, mode of operation, the CG mode of operation comprising determining a sequence of instances of uplink communications resources of the wireless access interface and transmitting signals to the wireless communications network in at least one instance of the sequence of instances of uplink communications resources of the wireless access interface, transmitting uplink data to the wireless communications network in two or more instances of the sequence of instances of uplink communications resources of the wireless access interface as a plurality of repetitions of the uplink data, and transmitting one or more of a plurality of versions of uplink control information, CG-UCI, to the wireless communications network, each version of CG-UCI being associated with a plurality of instances of the sequence of instances of uplink communications resources of the wireless access interface. Here, the one or more transmitted versions of CG-UCI are each transmitted as two or more separate portions, each of the two or more portions being transmitted within different instances of the two or more instances during the transmission of the uplink data.

Embodiments of the present technique, which, in addition to methods of operating communications devices, relate to methods of operating infrastructure equipment, communications devices and infrastructure equipment, and circuitry for communications devices and infrastructure equipment, allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
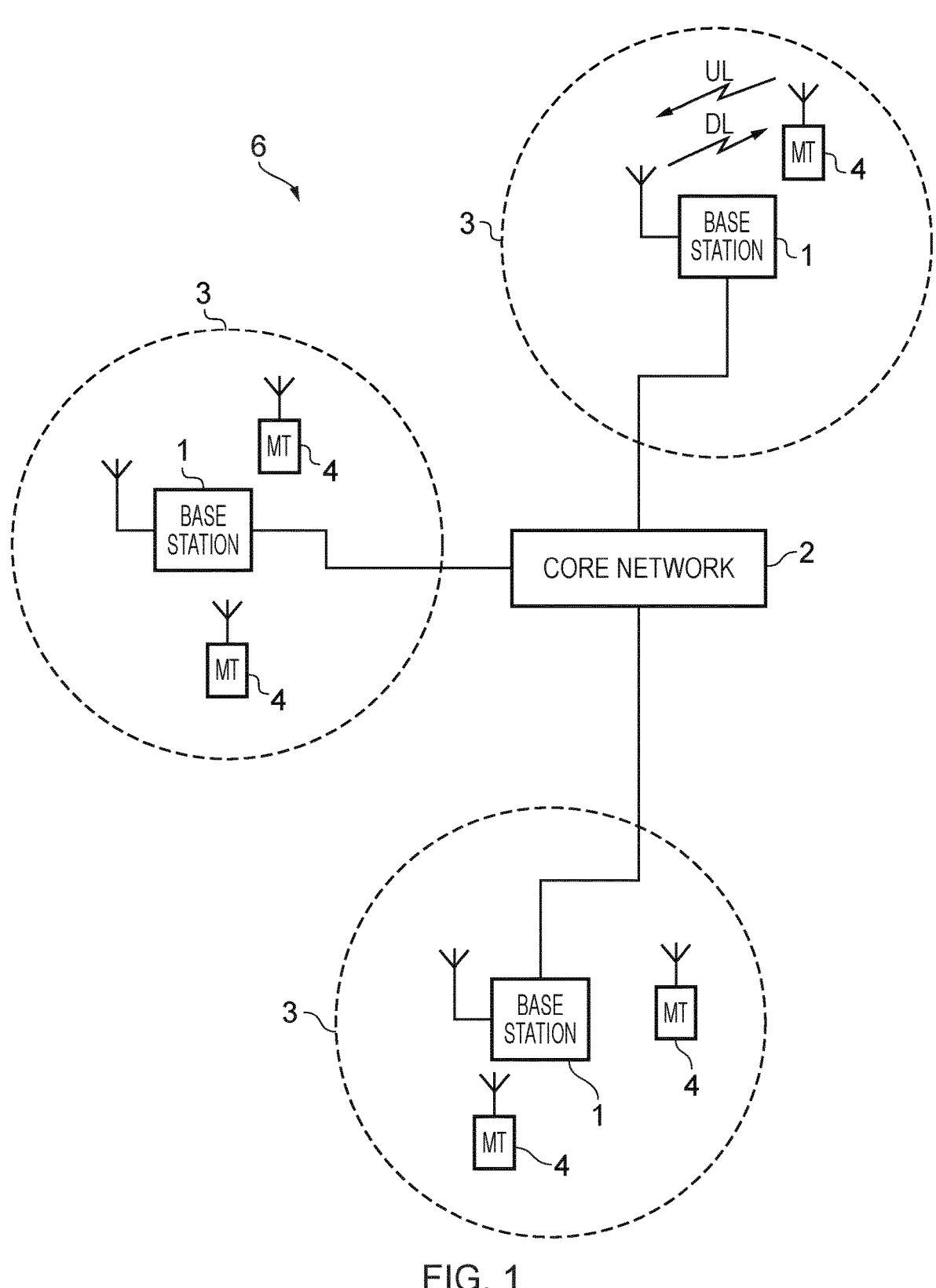
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
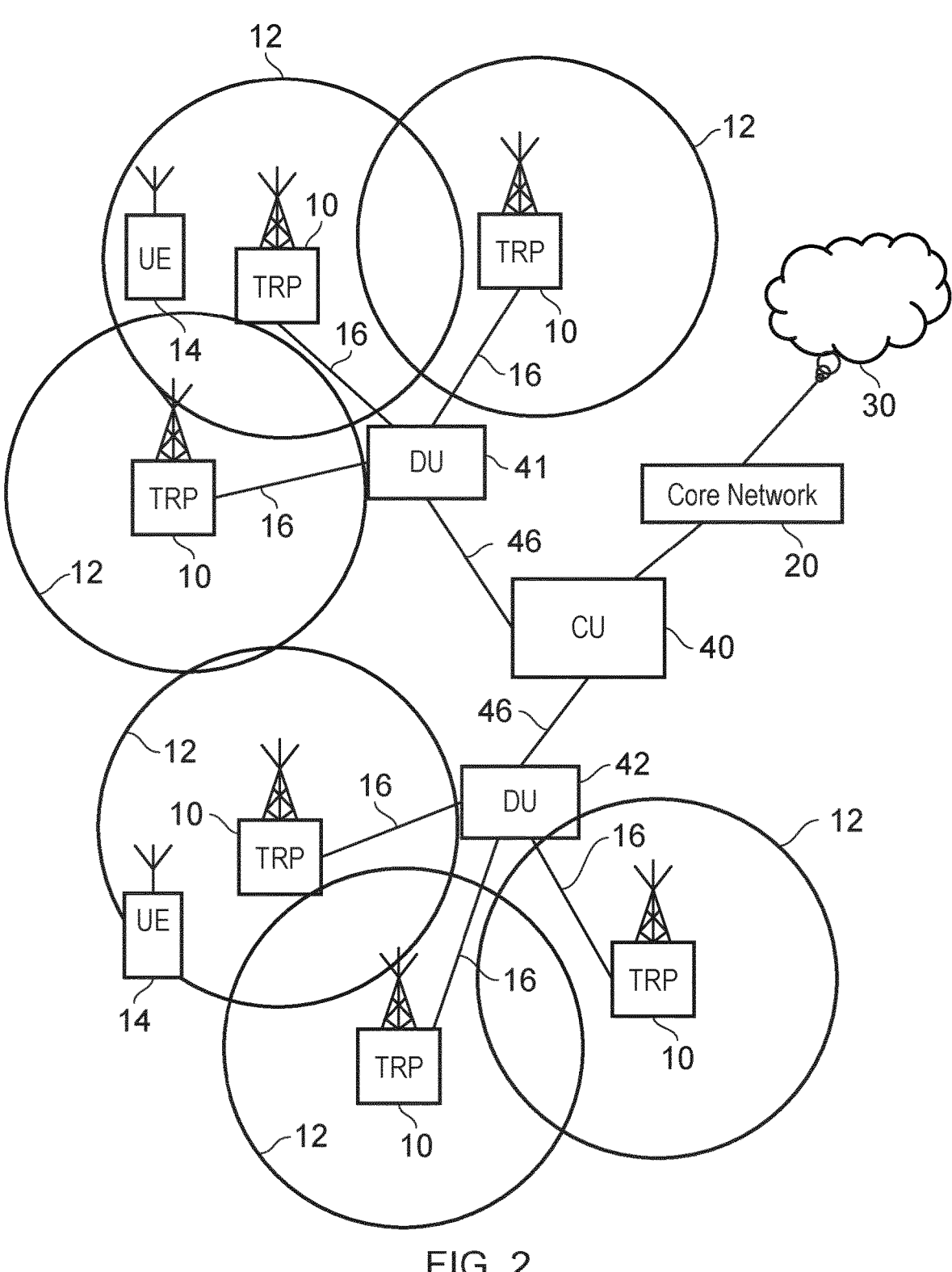
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
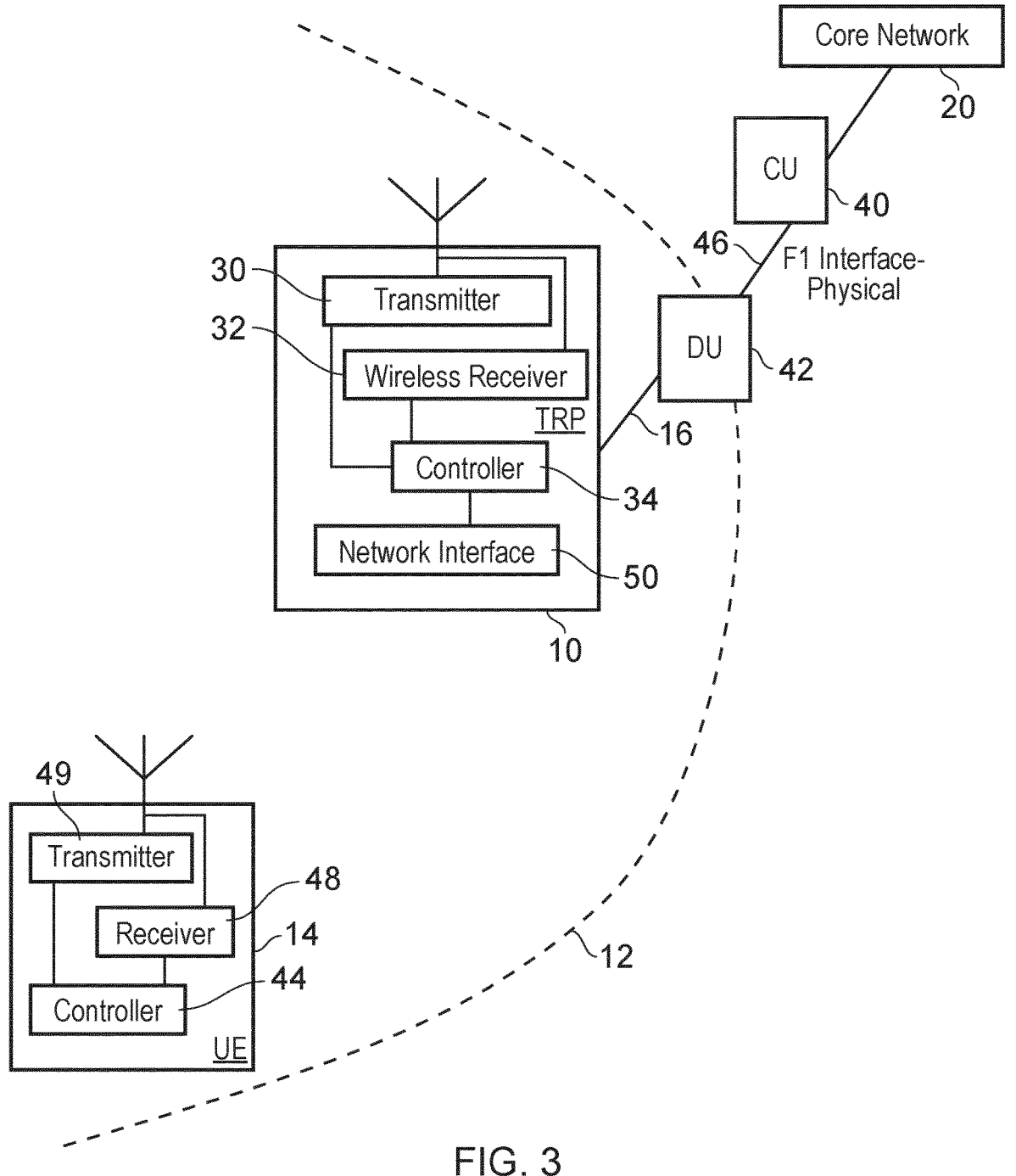
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

eURLLC and NR-U

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. A requirement for Ultra Reliable and Low Latency Communications (URLLC) services is that one transmission of a 32 byte packet is required to be transmitted from the radio protocol layer 2/3 SDU ingress point to the radio protocol layer 2/3 SDU egress point of the radio interface within 1 ms with a reliability of $1\text{-}10^{-5}$ (99.999%) or higher (99.9999%) [2]. Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

Enhanced URLLC (eURLLC) [3][4] specifies features that require high reliability and low latency, such as factory automation, transport industry, electrical power distribution, etc. It should be appreciated that the Uplink Control Information (UCI) for URLLC and eMBB will have different requirements. Hence, one of the current objectives of eURLLC is to enhance the UCI to support URLLC, where the aim is to allow more frequent UCI to be transmitted, such as the transmission of more Hybrid Automatic Repeat Request Acknowledgement (HARQ-ACK) feedback per slot, and to support multiple HARQ-ACK codebooks for different traffic services. Solutions identified to accommodate more frequent UCI without interrupting the high-priority and low-latency data transmissions using Physical Uplink Shared Channels (PUSCHs) can comprise the multiplexing of UCI onto PUSCH repetitions.

Another such service incorporating NR technology is 5G NR in Unlicensed Spectrum (NR-U) [5], which enable devices to make use of shared and unlicensed spectrum bandwidth. Such features as Listen Before Talk (LBT), as specified by [5], may be incorporated into the NR frame structure for NR-U operation in unlicensed bands. One of the objectives of eURLLC, as laid out in [4], is to harmonise Configured Grant (CG) PUSCH operations in eURLLC and NR-U.

Channel Access in an Unlicensed Band

In the following paragraphs, an explanation is provided of current proposals for accessing communications from an unlicensed frequency band. In an unlicensed band, two or more systems may operate to communicate using the same communications resources. As a result, transmissions from different systems can interfere with each other especially when for example, each of the different systems are configured according to different technical standards, for example Wi-Fi and 5G. Of course, transmissions from systems operating in accordance with the same standard may also cause interference. As such, there is a regulatory requirement to use an LBT protocol for each transmitter operating in an unlicensed band to reduce interferences among different systems (either operating according to the same or different technical standards as one another) sharing that band. In LBT, a device that wishes to transmit a packet will firstly sense the band for any energy levels above a threshold to determine if any other device is transmitting, i.e. it listens, and if there is no detected transmission, the device will then transmit its packet. Otherwise, if the device senses a transmission from another device it will back-off and try again at a later time.

Figure 4:
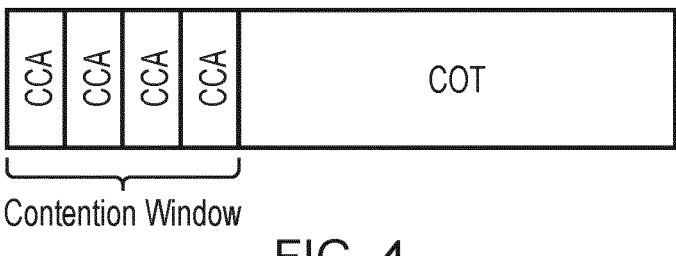
FIG. 4 illustrates an example of a New Radio Unlicensed (NR-U) Channel Access on a grid of radio communications resources.

In NR-U the channel access can be Dynamic (also known as Load Based Equipment) or Semi-Static (also known as Frame Based Equipment). The dynamic channel access schemes consist of one or more Clear Channel Assessment (CCA) phases in a Contention Window followed by a Channel Occupancy Time (COT) phase as shown FIG. 4. LBT is performed during the CCA phase by an NR-U device (e.g. gNB or UE) that wishes to perform a transmission. According to the CCA phase, the NR-U device listens to one or more of CCA slots and if no other transmission is detected (i.e. energy level is determined to be below a threshold for the duration of the one or more CCA slots) after the CCA phase, the NR-U device moves into the COT phase where it can transmit its packet in the COT resources. In Dynamic Channel Access (DCA) the CCA and COT phases can be of different length between different systems whilst in Semi-static Channel Access, the CCA and COT phases have fixed time windows and are synchronised for all systems sharing the band. Further details on channel access in NR-U may be found in co-pending European patent application with application number EP20187799.0 [6].

In NR-U a device can be an initiating device or a responding device. The initiating device acquires the COT by performing CCA and typically it initiates a first transmission, e.g. a gNB transmitting an uplink grant. The responding device receives the transmission from the initiating device and responds with a transmission to the initiating device, e.g. a UE receiving an uplink grant and transmitting the corresponding PUSCH. As will be appreciated a UE can also be an initiating device, for example when it is transmitting a Configured Grant (CG) PUSCH, and the gNB can be a responding device.

There are two types of Dynamic Channel Access (DCA), which are referred to as Type 1 and Type 2. In a Type 1 DCA, a counter N is generated as a random number between 0 and $CW_p$, where a Contention Window size $CW_p$ is set between $CW_{min,p}$ and $CW_{max,p}$. The duration of the COT and the values $\{CW_{min,p}, CW_{max,p}\}$ depend on the value p, which is the Channel Access Priority Class (CAPC) of the transmission. The CAPC may be determined, for example, by a QoS of the transmitting packet. A Type 1 DCA is performed by an initiating device, and once the COT is acquired, one or more responding devices can use Type 2 DCA for their transmissions within the COT. Type 2 DCA may require a short CCA or no CCA prior to transmission if the gap between one transmission of two devices is less than a predefined value, such as, for example, 25 µs. If the gap is greater than this predefined value such as 25 µs, then the responding device needs to perform Type 1 DCA.

Figure 5:
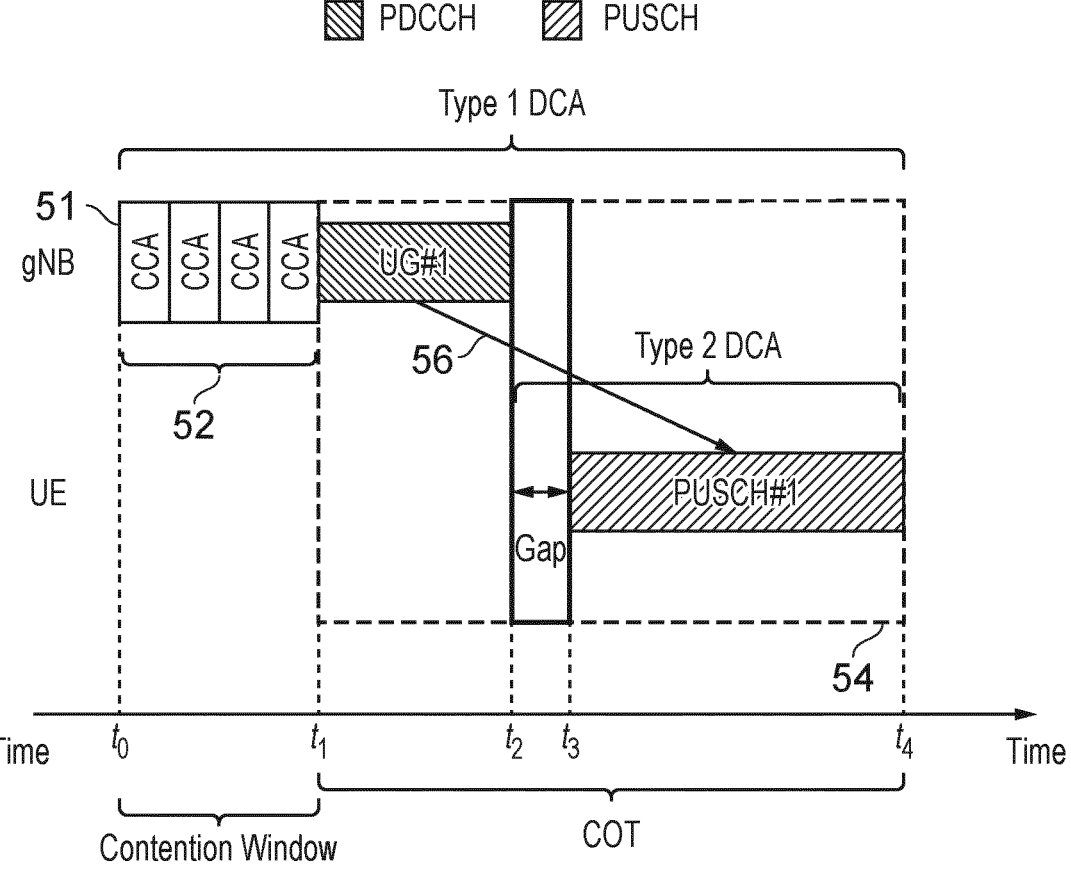
FIG. 5 illustrates an example of Type 1 and Type 2 Dynamic Channel Access on an uplink and downlink grid of radio communications resources.

FIG. 5 provides an illustration of frequency against time for transmission in an unlicensed band. As shown for the example of FIG. 5, an example of a Type 1 DCA transmission and an example of a Type 2 DCA transmission are shown. According to the example shown in FIG. 5, at time $t_0$, the gNB wishes to send an uplink grant, UG#1, to the UE to schedule PUSCH#1. The gNB performs a Type 1 DCA starting with a Contention Window with four CCAs 51, so that for this example the random number N=4, and detects no energy during this Contention Window 52, thereby acquiring the COT 54 between time $t_1$ to $t_4$. The gNB then transmits UG#1 to the UE scheduling a PUSCH#1 at time $t_3$ as represented by arrow 56. The UE receiving the uplink grant UG#1 then can use Type 2 DCA if the gap between UG#1 and the start of its PUSCH#1 transmission, between time $t_2$ and $t_3$ is below a threshold, otherwise the UE will have to perform a Type 1 DCA. This is to say, if the granted PUSCH#1 is less than a threshold time from the gNB's transmission of the uplink grant UG#1 or other gNB transmissions, then the UE is not required to make a contention itself for the resources on the unlicensed band by transmitting in the CCA and then COT according to the Type 1 DCA.

Figure 6:
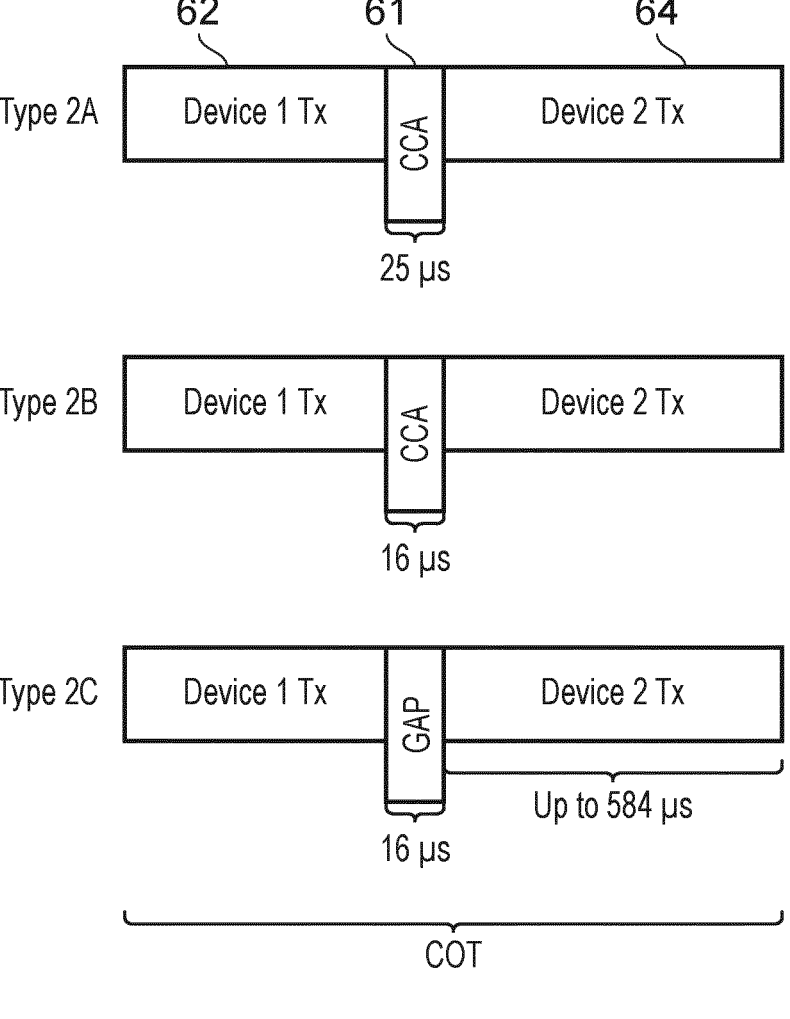
FIG. 6 illustrates examples of Type 2 Dynamic Channel Access on a grid of radio communications resources.

There are three types of Type 2 DCA, as shown in FIG. 6, which are defined with respect to a length of the gap 61 between transmission 62 by a first device (initiating device) and transmission 64 by a second device (responding device) within a COT, and are therefore defined by whether the second responding device needs to perform a CCA. These types are:

Type 2A: The gap between two transmissions is more than 16 □s and not more than 25 µs and the UE performs a single clear channel assessment (CCA) within this gap 61;

Type 2B: The gap between two transmissions is not more than 16 µs and the UE performs a single CCA within this gap 61; and Type 2C: The gap between two transmissions is not more than 16 µs no CCA is required within this gap 61.

A COT can be shared by multiple devices; i.e. a gNB can initiate the COT which it can then share with one or more UE. For example, a gNB can initiate a COT, and then can transmit an UL Grant to a UE, and the UE can then use this COT to transmit the PUSCH. A device using a COT initiated by another device may not need to perform CCA, or may need to perform just a short CCA. Those skilled in the art would appreciate that a UE can also initiate a COT.

Rel-15 Configured Grant

As is well understood by those skilled in the art, a UE uses a Physical Uplink Shared Channel (PUSCH) for uplink data transmission. The PUSCH resources used for the transmission of the PUSCH can be scheduled by a gNB using a Dynamic Grant (DG) or a Configured Grant (CG).

In a Dynamic Grant PUSCH (DG-PUSCH), the UE typically sends a Scheduling Request (SR) to the gNB when uplink data arrives at its buffer. In response to receiving the SR, the gNB would then send an Uplink Grant, e.g. via Downlink Control Information (DCI) using DCI Format 0_0, 0_1 or 0_2, carried by a Physical Downlink Control Channel (PDCCH) to the UE where this Uplink Grant schedules resources for a PUSCH. The UE then uses the scheduled PUSCH (i.e. DG-PUSCH) to transmit its uplink data.

It is observed that the use of DG-PUSCHs introduces latency, since the UE needs to initiate an SR and has to wait for an Uplink Grant before it is scheduled PUSCH resources. For regular and periodic traffic, DG-PUSCH would lead to multiple SR and Uplink Grants being sent which is not an efficient use of resources. Hence, recognising the drawbacks of DG-PUSCH, Configured Grant PUSCH (CG-PUSCH) is introduced in NR. In CG-PUSCH, the UE is pre-configured using Radio Resource Control (RRC) configuration periodic PUSCH resources, such that the UE can transmit its uplink data in any of these regularly occurring CG-PUSCH resources without the need to request it with an SR. There are two types of CG-PUSCH:

Type 1 CG-PUSCH: Once the CG-PUSCH resource is configured by RRC, the UE can use it without activation; and Type 2 CG-PUSCH: The CG-PUSCH resource is firstly RRC configured. The UE can only use the CG-PUSCH resource if it receives an activation DCI, which is an UL Grant with a Configured Scheduling-Radio Network Temporary Identifier (CS-RNTI). Once the CG-PUSCH is activated the UE can use it until it is deactivated by another DCI. Type 2 CG-PUSCH provides better control for the gNB scheduler and therefore more efficiently utilises resources.

Figure 7:
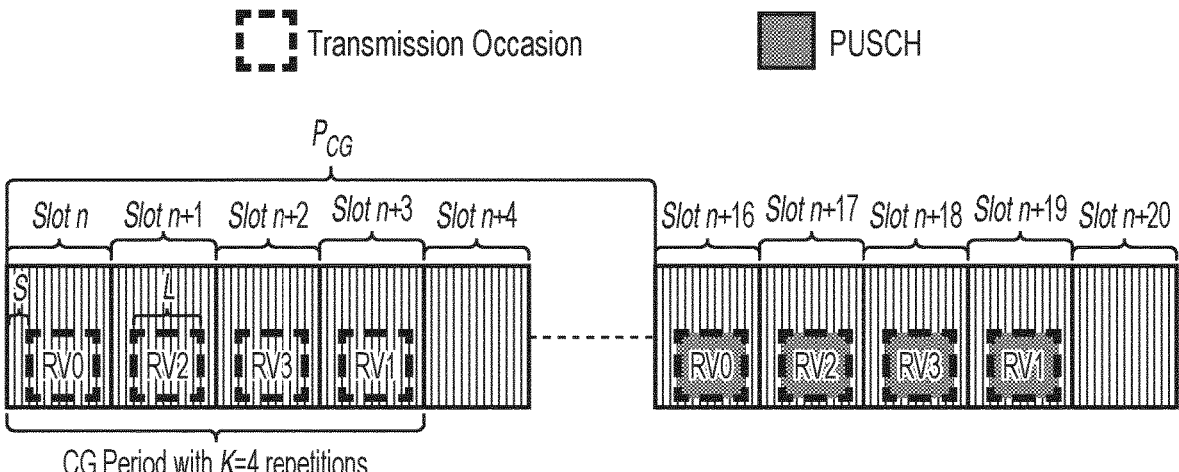
FIG. 7 illustrates the time-domain parameters for a Configured Grant Physical Uplink Shared Channel (CG-PUSCH)

In the time domain, a CG-PUSCH consists of a periodicity $P_{CG}$, repetitions K={1, 2, 4, 8}, duration L of the PUSCH and starting symbol offset relative to slot boundary S of the PUSCH. An example is shown in FIG. 7, where the CG-PUSCH has a periodicity $P_{CB}$=224 symbols (or 16 slots), repetition of K=4, duration of L=9 symbols and a starting symbol S=3 symbols from the start of slot boundary. The CG-PUSCH consists of Transmission Occasions (TO), where a TO is an opportunity for the UE to transmit uplink data. It should be noted here that the UE does not need to use a TO, i.e. a CG-PUSCH resource, if it has no uplink data to transmit. For example, in Slot n, the UE does not have any uplink data and so it does not transmit anything in the TOs for that CG period but in the next CG Period starting in Slot n+16, the UE has uplink data and therefore uses the TOs in that CG Period to transmit four repetitions of the uplink data.

Figure 8:
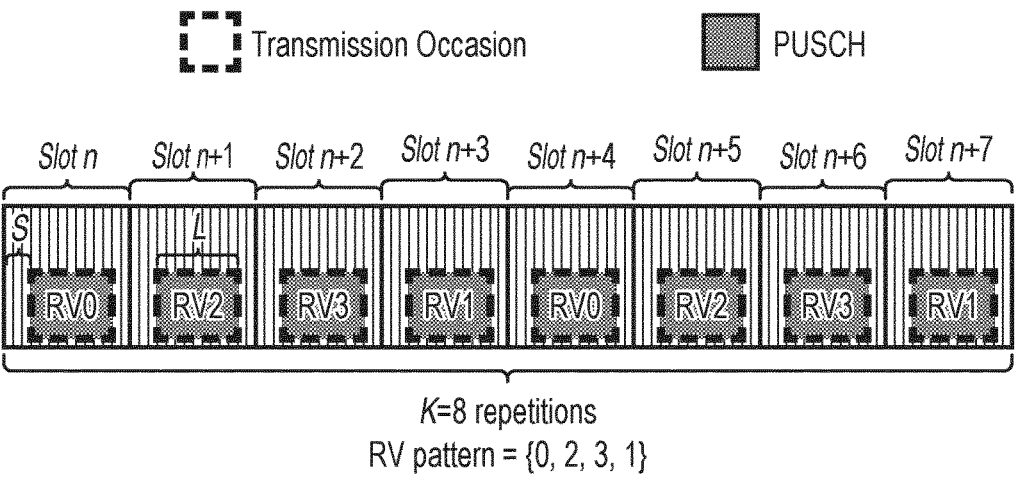
FIG. 8 demonstrates how Redundancy Version (RV) patterns restart during PUSCH repetitions.

The first TO in a CG Period is associated with Redundancy Version RV=0. If repetition K>1, then each TO in the CG Period is associated with an RRC configured RV pattern, where the RV pattern can be {0, 2, 3, 1}, {0, 3, 0, 3} or {0, 0, 0, 0}. The RV pattern is configured in RRC parameter repK-RV. For example, in FIG. 7, the RV pattern={0, 2, 3, 1}. The first PUSCH transmission in a CG Period must always start with RV=0. For repetition K=8, the RV pattern is cycled after the fourth repetition; i.e. the RV pattern restarts after the fourth repetition. For example, in FIG. 8, the RV pattern={0, 2, 3, 1} and K=8 repetitions. Here the UE cycles the RV at the fifth repetition, where the RV pattern is restarted at the fifth TO of the CG period in Slot n+4.

Since HARQ is used for PUSCH transmission, each PUSCH is associated with a HARQ Process Number (HPN) where there are 16 HARQ processes, i.e. HPN=0 to 15. In DG-PUSCH, the HPN is indicated in the UL Grant. For CG-PUSCH, since there is no UL Grant, each CG period is associated with an HPN and is dependent upon the starting symbol $O_{CG}$ (in units of symbols) of the first TO in a CG period relative to SFN=0, the periodicity $P_{CG}$ (in units of symbols) and the number of HARQ processes $N_{HARQ}$ configured for the CG-PUSCH [7] (i.e. the gNB can configured less than 16 HARQ processes for a CG-PUSCH), i.e.:

$$HPN = \left\lfloor \frac{O_{CG}}{P_{CG}} \right\rfloor \text{MOD } N_{HARQ}$$

Where $\lfloor . \rfloor$ is the Floor function and $O_{CG}$ is relative to the first symbol of the first slot of the radio frame with SFN=0.

Retransmission of a CG-PUSCH is scheduled using an UL Grant. That is, a DG-PUSCH is used for the retransmission of a CG-PUSCH that is not decoded successfully at the gNB. If the UE does not receive an UL Grant for the retransmission of a CG-PUSCH within a pre-configured timer $T_{CG-ACK}$, the UE will consider that the CG-PUSCH has been received successfully.

Rel-16 eURLLC CG-PUSCH

Since the first CG-PUSCH transmission must use a TO with RV=0, if the UE misses that TO, it may not be able to transmit any PUSCH in that CG Period. For example, referring back to FIG. 7, if the uplink data arrives at the UE buffer in Slot n+1, then the UE may only be ready to transmit a PUSCH in Slot n+2 but the TO in Slot n+2 corresponds to RV=3 and so the UE cannot start its PUSCH transmission. It then has to wait till the next CG Period in Slot n+16 for a TO with RV=0 to start its transmission. This introduces latency for the PUSCH transmission, which may not meet the stringent latency requirement in URLLC.

Figure 9:
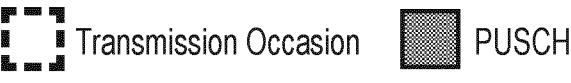
FIG. 9 shows an example of how a UE may be unable to complete PUSCH repetition transmissions.
Figure 9:
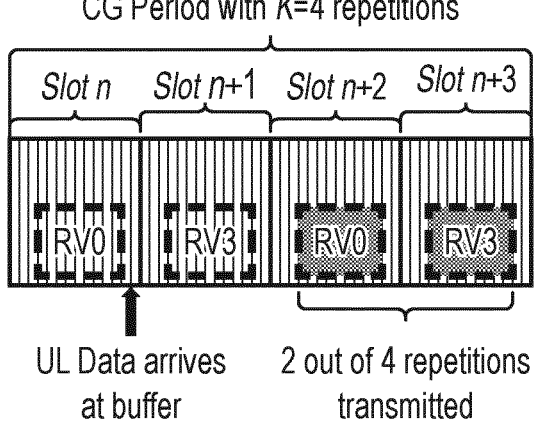

In order to improve reliability, PUSCH is transmitted using repetitions, as has been mentioned above. For CG-PUSCH, if the uplink data does not arrive before the first TO of a CG Period, the UE may not be able to transmit the required number of repetitions, even if there are multiple TOs with RV=0 within that CG Period. For example, in FIG. 9, a CG-PUSCH is configured with K=4 repetitions and an RV pattern {0, 3, 0, 3} thereby allowing two TOs where the first PUSCH transmissions can start (i.e. the first and third TOs). Uplink data arrives at the UE buffer at the end of Slot n, thereby missing the first TO of the CG Period. Since the UE has to start its PUSCH transmission in a TO with RV=0, the PUSCH is transmitted in Slot n+2, i.e. the closest TO with RV=0. However, there are only two TOs left in that CG Period and so the UE is only able to transmit two out of the targeted four repetitions. The reduced PUSCH repetition transmissions may not meet the strict reliability requirement for URLLC.

Figure 10:
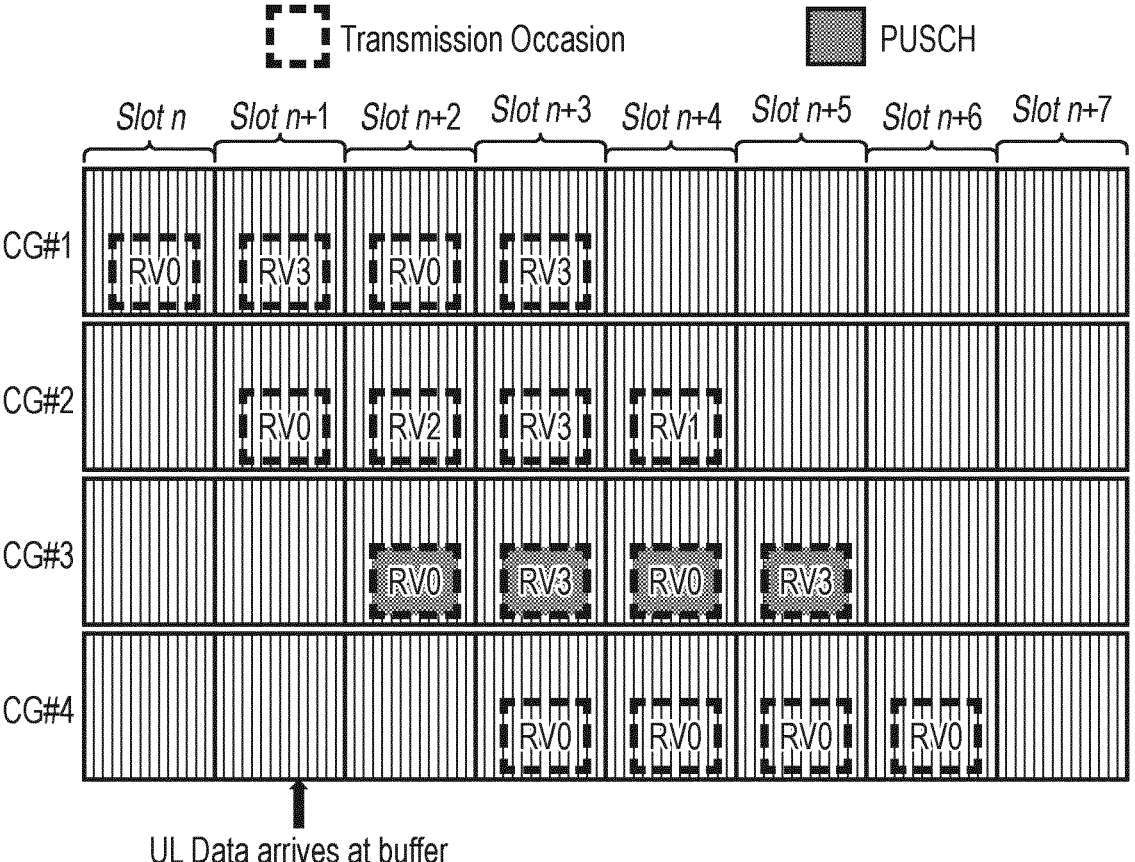
FIG. 10 illustrates an example of multi CG-PUSCH.

Recognising the drawbacks of Rel-15 CG-PUSCH, multi CG-PUSCH was introduced for Rel-16 eURLLC, where a UE can be configured with up to 12 CG-PUSCH where each CG-PUSCH can be independently configured. A configuration can be made such that different CG-PUSCHs start at different times so that a UE has multiple opportunities to transmit its PUSCH. For example, in FIG. 10, a UE is configured with four CG-PUSCHs, labelled as CG#1, CG#2, CG#3 and CG#4 and each with repetition K=4. These CG-PUSCHs are configured such that they start within one slot offset of one another. At Slot n+1, uplink data arrives at the UE's buffer and the possible TOs that the UE can use to start its PUSCH transmissions are the third TO (Slot n+2) of CG#1, the first TO (Slot n+2) of CG#3 and the first TO (Slot n+3) of CG#4. In order to ensure K=4 repetitions, the UE can use CG#3 or CG#4 but since CG#3 offers the lowest latency, the UE selects CG#3 for its PUSCH transmissions thereby ensuring K=4 repetitions and minimising latency. It would be appreciated by those skilled in the art that the staggering of multiple CG-PUSCH resources as shown in FIG. 10 is just one possible configuration to ensure K repetitions are sent with minimum latency. The gNB is free to configure other arrangements as each CG-PUSCH can be individually configured.

For Type 2 CG-PUSCH, a CG-PUSCH can be individually activated using the four-bit HPN field in an UL Grant. For deactivation, one or more CG-PUSCHs can be indicated for deactivation using the 16 states in the HPN field, where each state can be configured to indicate a combination of CG-PUSCHs for deactivation.

There are two PUSCH mapping types:

Type A: Where the PUSCH starts at the beginning of the slot, i.e. the symbol offset S=0; and Type B: Where the PUSCH can start at any symbol within the slot, i.e. S=0 to 13.

Figure 11:
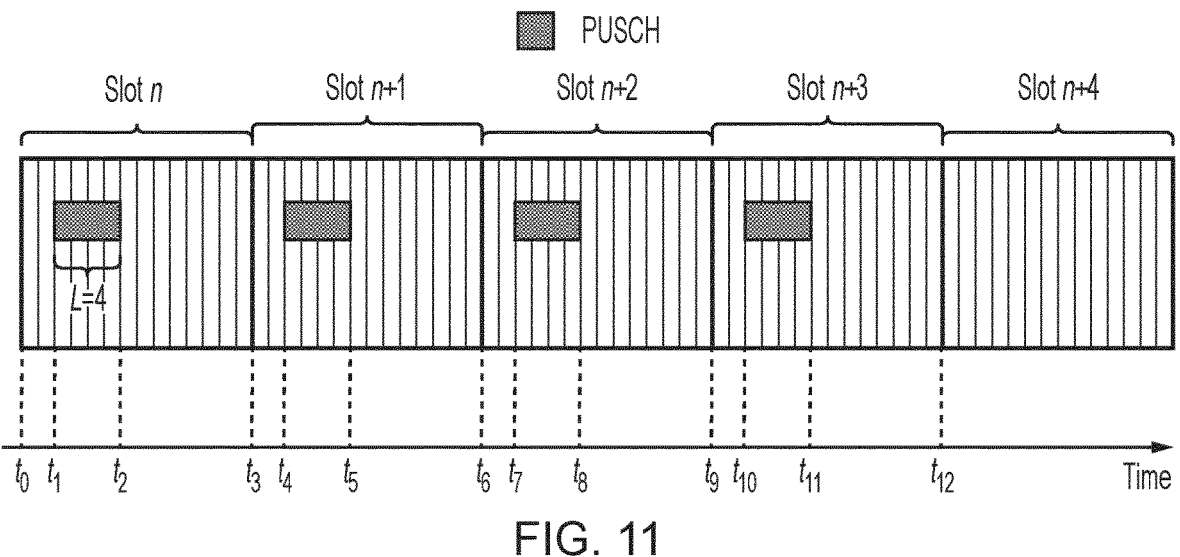
FIG. 11 shows an example demonstrating the operation of Rel-15 PUSCH Aggregation.

In Rel-15, slot based PUSCH repetition, known as PUSCH Aggregation, is introduced to improve the reliability of the PUSCH transmission. An example is shown in FIG. 11, where a Type B PUSCH of four symbols duration, i.e. L=4, which starts with two symbols offset from the slot boundary, is repeated four times, i.e. K=4, using PUSCH Aggregation starting from slot n to slot n+3. The number of repetitions for PUSCH Aggregation is RRC configured.

Figure 12:
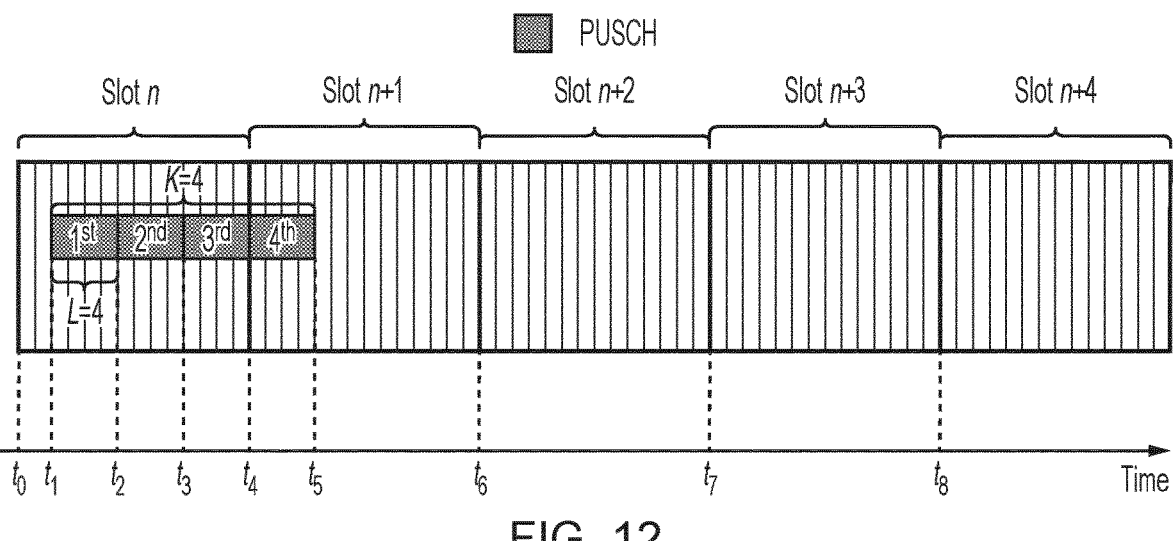
FIG. 12 shows an example demonstrating the operation of Rel-16 enhanced Type B (e-Type B) PUSCH Repetition.

In PUSCH Aggregation i.e. the slot based PUSCH repetition, where the PUSCH duration is less than a slot, time gaps between repetitions are observed. For the example in FIG. 11, the PUSCH is repeated at the slot level leaving a gap of 10 symbols between successive repetitions. Such gaps introduce latency and therefore are not acceptable for URLLC. Recognising this, in Rel-16 eURLLC, Enhanced Type B PUSCH Repetition (e-Type B PUSCH) is introduced where the PUSCH repetitions are repeated back-to-back, thereby minimising latency whilst improving reliability. An example is shown in FIG. 12, where a four symbol duration PUSCH, L=4, with two symbols offset from the slot boundary, is repeated four times, i.e. $K_N$=4, using Rel-16 PUSCH Repetition. Here, there are no gaps between each repetition, thereby completing the entire repetitions within 16 symbols as compared to 56 symbols (four slots) when using PUSCH Aggregation. Enhanced Type B PUSCH repetition is supported in DG-PUSCH and CG-PUSCH for Rel-16 eURLLC. In DG-PUSCH, the number of repetitions is indicated in the UL Grant, whilst for CG-PUSCH, the repetition number is RRC configured in the parameter repK.

Figure 13:
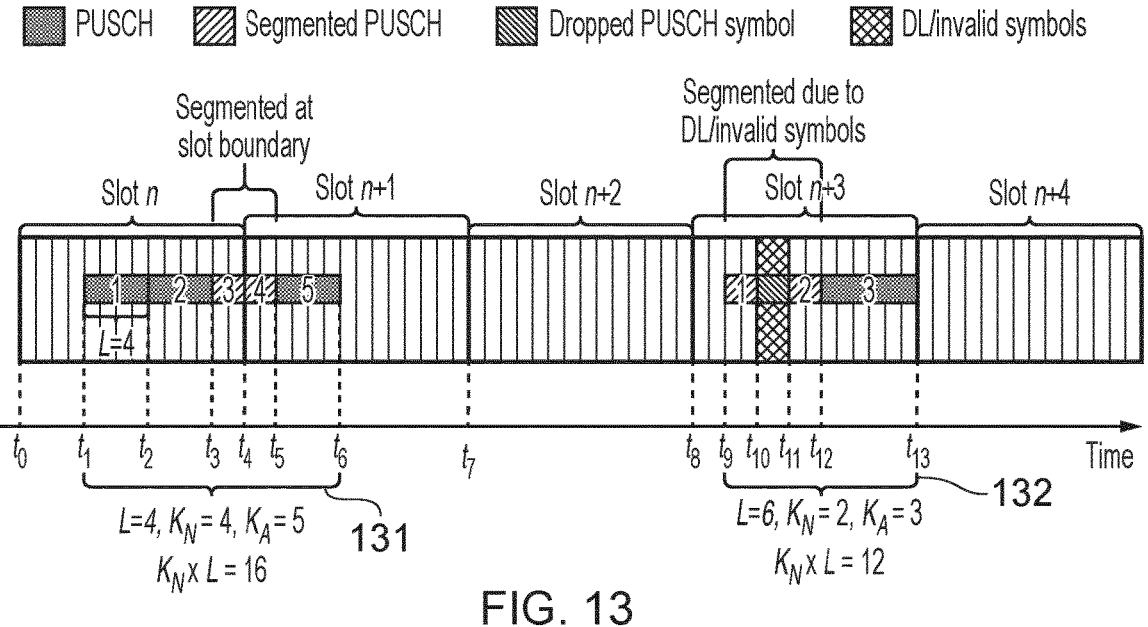
FIG. 13 illustrates an example of PUSCH segmentation.

Since e-Type B PUSCH can start at any symbol within a slot, some of its repetitions may cross a slot boundary, or may collide with an invalid Orthogonal Frequency Division Multiplexing (OFDM) symbol, e.g. a Downlink symbol, and these PUSCHs are segmented. A PUSCH repetition that is scheduled e.g. by an UL Grant or configured for a CG-PUSCH, is known as a nominal repetition. If segmentation occurs on a nominal PUSCH and it is segmented into two or more PUSCH segments, these segments are called actual repetitions $K_A$, i.e. these actual repetitions are PUSCH repetitions that are actually transmitted, which can therefore be larger than the number of nominal repetitions, i.e. the scheduled number of repetitions. The PUSCH duration L and nominal repetition number $K_N$ that are scheduled by an UL Grant or configured for a CG-PUSCH gives the absolute total duration of the PUSCH transmission; that is $K_N$×L is the duration of the entire PUSCH transmission and so any parts of the PUSCH transmission that collide with invalid OFDM symbols are dropped. FIG. 13 shows two examples of PUSCH segmentation. At time $t_1$, a PUSCH 131 with $K_N$=4, L=4 is transmitted, where the third nominal PUSCH repetition crosses the slot boundary at time $t_4$. Consequently, the third nominal PUSCH repetition is segmented into two PUSCH repetitions and therefore the actual number of repetitions $K_A$=5. At time $t_9$, another PUSCH 132 with $K_N$=2, L=6, is transmitted, where the first nominal PUSCH repetition collides with 2 DL (or invalid) symbols between time $t_{10}$ and $t_{11}$. Consequently, the first nominal PUSCH repetition is segmented into two PUSCH repetitions and therefore the actual number of repetitions $K_A$=3. Since $K_N$×L=12 OFDM symbols, is the total duration of the PUSCH transmission 132, the two PUSCH symbols that collide with the DL (or invalid) symbols between time $t_{10}$ and $t_{11}$ are therefore dropped.

In Rel-15, there are no priority levels at the Physical Layer, and when two UL transmissions collide, their information is multiplexed and transmitted using a single channel. The possible collisions are those between a Physical Uplink Control Channel (PUCCH) and another PUCCH and between a PUCCH and a PUSCH. It should be noted that priority levels are defined for the MAC layer in Rel-15, where there are 16 priority levels.

A UE can be configured to provide eMBB and URLLC services. Since eMBB and URLLC have different latency requirements, their uplink transmissions may collide. For example, after an eMBB uplink transmission has been scheduled, an urgent URLLC packet may arrive, which would need to be scheduled immediately and so its transmissions may collide with the eMBB transmission. In order to handle such intra-UE collisions with different latency and reliability requirements, two priority levels at the Physical Layer were introduced in Rel-16 for uplink transmissions, i.e. PUCCH and PUSCH. In Rel-16 intra-UE prioritisation is used; that is, when two UL transmissions with different Physical Layer priority levels (L1 priority) collide, the UE will drop the lower priority transmission. If both UL transmissions have the same L1 priorities, then the UE may reuse Rel-15 procedures (i.e. the UL transmissions are multiplexed and transmitted using a single channel). For CG-PUSCH, the L1 priority is RRC configured for each CG-PUSCH in the RRC parameter phy-PriorityIndex-r16.

Re1-16-NR-U CG-PUSCH

Figure 14:
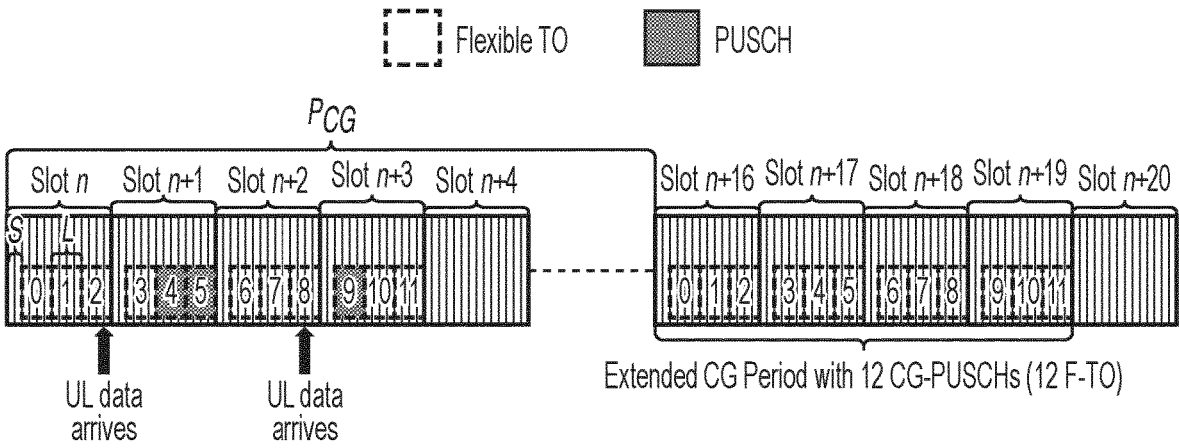
FIG. 14 shows an example of how Flexible Transmission Occasions (F-TOs) may be utilised.

Since LBT is required for a transmission, the UE may not be able to access a CG-PUSCH Transmission Occasion (TO), especially one that is associated with RV=0. Hence, recognising this, in Rel-16 NR-U, the TO is increased in each CG Period by extending the CG Period to cg-nrofSlots-r16 (1 to 40) slots, where each slot contains cg-nrofPUSCH-InSlot-r16 (1 to 7) consecutive CG-PUSCHs. The parameters cg-nrofSlots-r16 and cg-nrofPUSCH-InSlot-r16 are RRC configured per CG-PUSCH. The UE can start a PUSCH transmission in any of these CG-PUSCHs resources within the CG Period, instead of being limited to specific TOs with RV=0 in the legacy system as described above. Hence, effectively in each CG Period, the UE is provided with cg-nrofSlots-r16×cg-nrofPUSCH-InSlot-r16 Flexible TOs, and so the UE has multiple opportunities for LBT attempts to transmit its PUSCH. It should be noted that in 3GPP these TOs are called multi CG-PUSCH, but to avoid confusing these with Rel-16 eURLLC Multi CG-PUSCH as described above, these TOs are referred to herein as Flexible TOs (F-TO). An example is shown in FIG. 14, where $P_{CG}$=224 symbols (16 slots), S=2 symbols, L=4 symbols, cg-nrofSlots-r16=4 and cg-nrofPUSCH-InSlot-r16=3, which gives 12 Flexible TOs per CG Period. At the end of Slot n, UL data arrives at the UE buffer and the UE attempts to transmit it in the next F-TO, i.e. TO#3 in Slot n+1. However, the UE here in the example shown in FIG. 14 fails the LBT process and so it attempts another LBT on TO#4, in which case it is successful. The UE then transmits two PUSCH using TO#4 and TO#5 in Slot n+1 (which could be for different TBs or HPN). At the end of Slot n+2, further UL data arrives at the UE's buffer and it attempts LBT on the next F-TO, i.e. TO#9 in Slot n+3 and is successful, thereby transmitting the PUSCH in this slot.

For a CG-PUSCH transmission, the UE may need to perform the CCA and initiate a COT. The UE can share the COT with the gNB, for example to allow the gNB to send feedback signals for its CG-PUSCH transmissions. The DL resources within the COT for the gNB are indicated by the UE in a CG-UCI. Here, the UE indicates an index to an entry in a lookup table containing the slot offset $O_{DL}$ where the DL transmission can start, and the duration in slots $L_{DL}$ of the DL transmission. The lookup table is RRC configured with configurable $C_{DL}$ entries and they are signalled in the cg-COT-SharingList-r16 parameter. One of the entries in this lookup table indicates "No Sharing". The slot offset $O_{DL}$ is relative to the end of the slot containing the CG-UCI indicating the COT Sharing DL resources. An example of a "cg-COT-SharingList-r16" configuration with $C_{DL}$=4 entries as shown in Table I.

TABLE I

| DL resources for UE initiated COT sharing (cg-COT-SharingList-r16) | | |
|---|---|---|
| Index | $O_{DL}$ (slots) | $L_{DL}$ (slots) |
| 0 | No Sharing | No Sharing |
| 1 | 3 | 2 |
| 2 | 2 | 4 |
| 3 | 1 | 1 |

Figure 15:
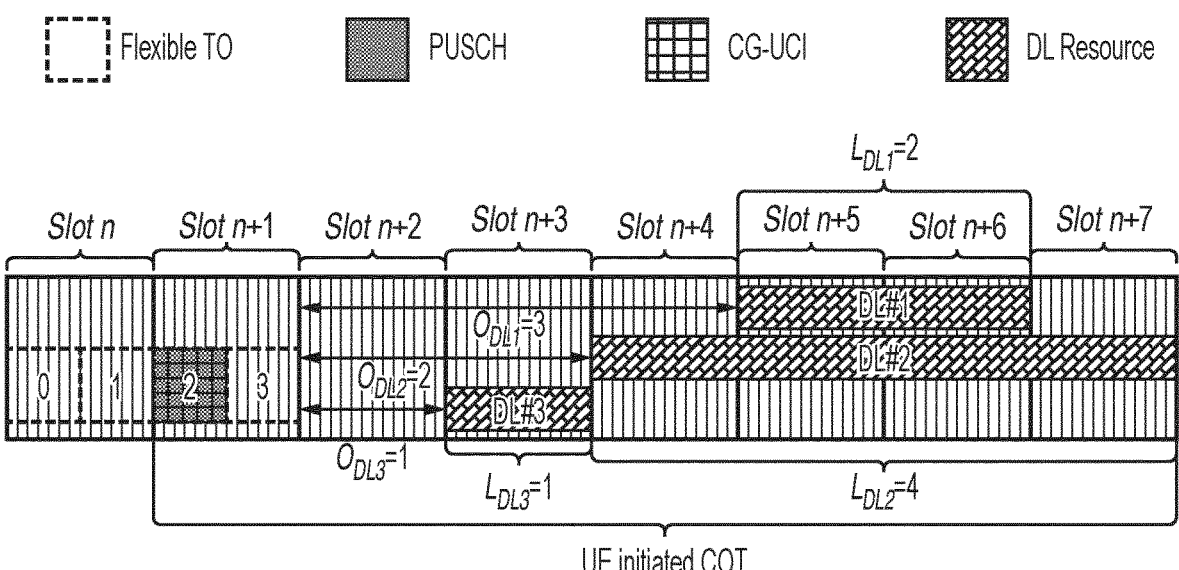
FIG. 15 illustrates an example of UE-initiated Channel Occupancy Time (COT) sharing.

FIG. 15 illustrates an example operation using the example configuration of Table I. Here, we label the offsets and DL resources according to their indices; i.e. $O_{DL1}$, $O_{DL2}$ and $O_{DL3}$ are offsets for indices 1, 2 and 3 respectively. Similarly, DL#1, DL#2 and DL#3 are DL resources for indices 1, 2 and 3 respectively, with duration $L_{DL1}$, $L_{DL2}$ and $L_{DL3}$ respectively. Resource for index 0 is not shown since it indicates "No Sharing". In FIG. 15, the UE has a CG Period with four F-TOs (i.e. cg-nrofSlots-r16=2 and cg-nrofPUSCH-InSlot-r16=2), the UE manages to acquire TO#2 for its PUSCH transmission and thereby acquiring a COT that is seven slots long. In the PUSCH transmission, the UE multiplexes CG-UCI containing COT Sharing Information where it indicates one of the three available DL resources that the gNB can use for HARQ-ACK feedback for its PUSCH transmission. Since the CG-UCI is in Slot n+1, the slot offsets $O_{DL1}$, $O_{DL2}$ and $O_{DL3}$ are relative to the end of Slot n+1.

In Rel-15 and Rel-16 eURLLC, the HPN and RV of each CG-PUSCH transmission is fixed for each TO and known to the gNB. However, since Flexible TOs are used in Rel-16 NR-U, where the UE can use any of the TOs for a first PUSCH transmission, and where different TBs (i.e. with different HPNs) can be transmitted in a CG Period, the gNB needs to know the HPN and the RV of each of these CG-PUSCHs. In order to provide this information to the gNB, CG Uplink Control Information (CG-UCI) is introduced for Rel-16 NR-U which consists of the following fields [8]:

HARQ Process Number (HPN), which is indicated using 4 bits of the CG-UCI;

Redundancy Version (RV), which is indicated using 2 bits of the CG-UCI;

New Data Indicator (NDI), which is indicated using 1 bit of the CG-UCI; and

COT sharing information which is indicated using a number of bits of the CG-UCI equal to $\log_2 C_{DL}$, where $C_{DL}$ is the number of entries in a lookup table indicating the locations of DL resources that the gNB can use within the UE initiated COT.

The CG-UCI is multiplexed into the CG-PUSCH transmission.

In Rel-15 and Rel-16 eURLLC, an implicit HARQ-ACK feedback is used for CG-PUSCH, where a NACK is implicitly indicated with an UL Grant scheduling a retransmission for the CG-PUSCH, and the timer $T_{CG-ACK}$ is used to implicitly indicate an ACK.

Figure 16:
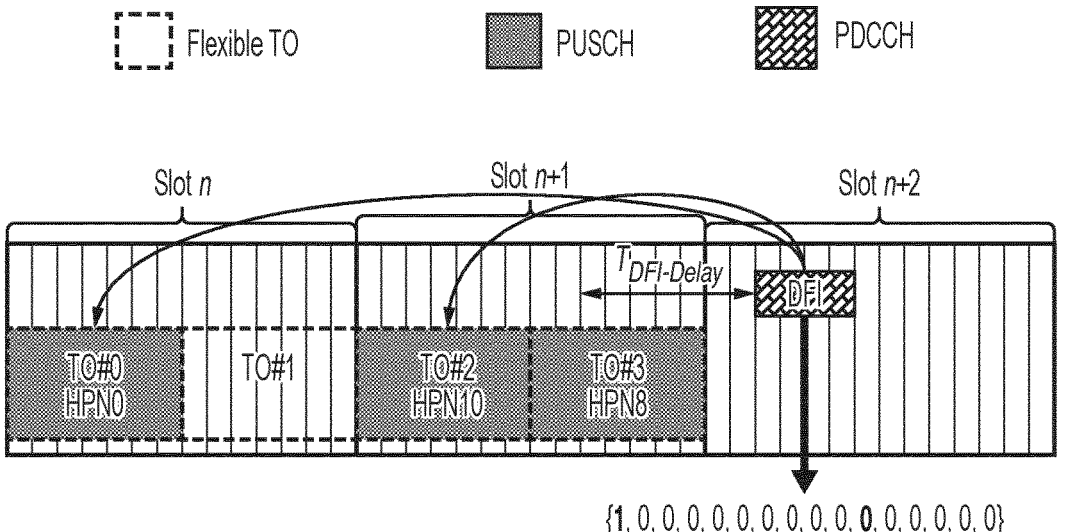
FIG. 16 illustrates an example demonstrating how a minimum Downlink Feedback Information (DFI) delay may indicate for which of a plurality of TOs feedback carried by DFI relates.

For Rel-16 NR-U, an explicit HARQ-ACK is used for CG-PUSCH, which is carried by Downlink Feedback Information (DFI). The DFI is carried by the PDCCH and it contains a 16-bit bitmap indicating the ACK/NACK for each HPN where "1" indicates ACK and "0" indicates NACK. The HARQ-ACK feedbacks in the DFI are applicable not only for CG-PUSCHs but also for DG-PUSCHs that are transmitted at least $T_{DFI-Delay}$ symbols prior to the start of the DFI. $T_{DFI-Delay}$ is RRC configured in parameter cg-minDFI-Delay-r16. An example is shown in FIG. 16, where a CG Period consists of four F-TOs and the UE transmits PUSCH on TO#0, TO#2 and TO#3 with HPN=0, HPN=10 and HPN=8 respectively. The $T_{DFI-Delay}$=7 symbols and in this example the DFI can only feedback HARQ-ACKs for TO#0 and TO#2, which are indicated in the first and eleventh positions respectively in the DFI bitmap according to their HPN (these are indicated as bold and underlined in FIG. 16). Since TO#3 ends with fewer than $T_{DFI-Delay}$ symbols before the start of the DFI, the HARQ-ACK for TO#3 is not represented in the DFI and is indicated as "0" regardless of whether it is an ACK or NACK.

The DFI does not indicate any uplink resource for the UE, and so the retransmission of a CG-PUSCH is transmitted using another CG-PUSCH resource. The gNB determines that a CG-PUSCH is a retransmission using the NDI and HPN fields of the CG-UCI. The UE can also decide on the RV of the retransmission (or the first transmission) since it can be indicated in the CG-UCI.

The transmission of the DFI is not guaranteed since the gNB has to perform LBT especially for the scenario where the DFI is not transmitted within the UE initiated COT. A retransmission timer $T_{CG-ReTx}$ is introduced for Rel-16 NR-U, which is started after a CG-PUSCH transmission. If this retransmission timer expires without the UE receiving an explicit HARQ-ACK (i.e. a DFI) from the gNB, the UE will retransmit that CG-PUSCH.

In Rel-16 NR-U, the CG-UCI is transmitted in each PUSCH repetition, where the CG-UCI indicates the HPN, RV, NDI and COT Sharing Information. In URLLC, PUSCH repetitions are introduced to improve reliability of the data transmission. Since CG-UCI may carry different RV information in each PUSCH repetition, the CG-UCI cannot benefit from any combining gain from these repetitions, and therefore may not have sufficient reliability to meet URLLC requirements.

The CG-UCI needs to be decoded correctly in order to be able to decode the PUSCH, since the CG-UCI signals some of the parameters that are needed for PUSCH decoding (e.g. the CG-UCI indicates the RV applied to the PUSCH transmission, i.e. indicates which set of parity and systematic bits is contained within the PUSCH). Hence, if the CG-UCI is not reliable, the PUSCH that is associated with the CG-UCI is also not reliable and the URLLC latency and reliability requirements may not be met. Embodiments of the present technique propose ways in which the reliability of CG-UCI can be increased in order, for example, to meet the latency and reliability requirements of URLLC. Embodiments of the present technique seek to ensure that the CG-UCI reliability is improved such that the CG-UCI is not the weakest link with respect to the reliability of the PUSCH.

Improved URLLC UCI Reliability

Figure 17:
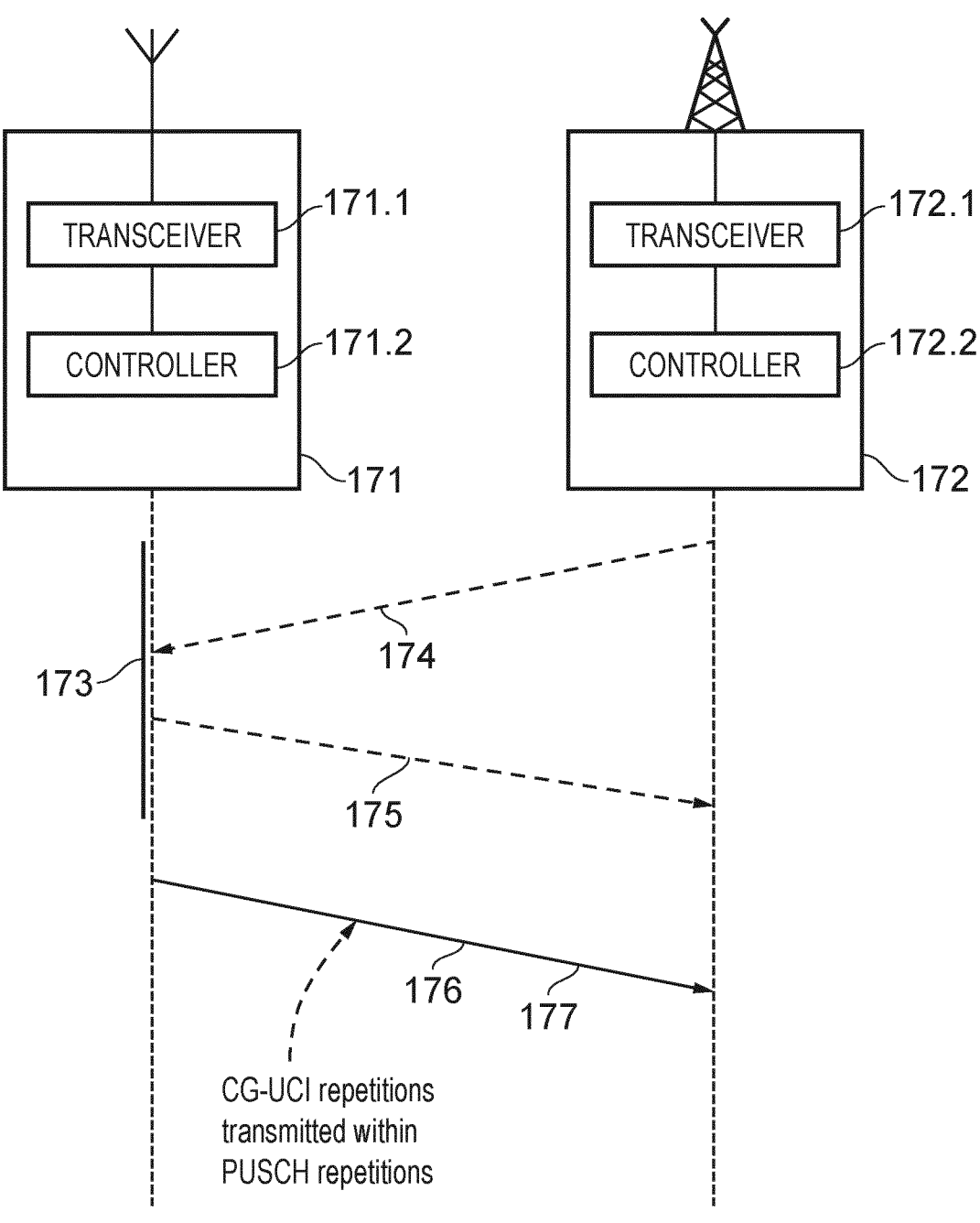
FIG. 17 shows a first part schematic, part message flow diagram representation of a wireless communications network comprising a communications device and an infrastructure equipment in accordance with embodiments of the present technique.

FIG. 17 shows a part schematic, part message flow diagram representation of a wireless communications network comprising a communications device 171 and an infrastructure equipment 172 in accordance with at least some embodiments of the present technique. The communications device 171 is configured to transmit data to or receive data from the wireless communications network, for example, to and from the infrastructure equipment 172, via a wireless access interface provided by the wireless communications network. Specifically, the communications device 172 may be configured to transmit data (for example, Ultra Reliable Low Latency Communications (URLLC) data) to the wireless communications network (e.g. to the infrastructure equipment 172) via the wireless access interface. The communications device 171 and the infrastructure equipment 172 each comprise a transceiver (or transceiver circuitry) 171.1, 172.1, and a controller (or controller circuitry) 171.2, 172.2. Each of the controllers 171.2, 172.2 may be, for example, a microprocessor, a CPU, or a dedicated chipset, etc.

As shown in the example of FIG. 17, the transceiver circuitry 171.1 and the controller circuitry 171.2 of the communications device 171 are configured in combination, to operate 173 in accordance with a configured grant (CG) mode of operation, the CG mode of operation comprising the communications device 171 being configured to determine 174 (e.g. via an activation indication or other such command received from the wireless communications network, such as from infrastructure equipment 172) a sequence of instances of uplink communications resources of the wireless access interface, and to transmit 175 signals to the wireless communications network (for example, to the infrastructure equipment 172) in at least one instance of the sequence of instances of uplink communications resources of the wireless access interface, to transmit 176 uplink data, to the wireless communications network (for example, to the infrastructure equipment 172), in two or more instances of the sequence of instances of uplink communications resources of the wireless access interface as a plurality of repetitions of the uplink data (where each instance may comprise one or more repetitions of the same PUSCH), and to transmit 177 one or more of a plurality of versions of uplink control information, CG-UCI, to the wireless communications network (for example, from the infrastructure equipment 172), each version of CG-UCI being associated with a plurality of instances of the sequence of instances of uplink communications resources of the wireless access interface. Here, the communications device 171 is configured to transmit 176, 177 the uplink data and the CG-UCI such that the one or more transmitted 177 versions of CG-UCI are each repeated a plurality of times during the transmission 176 of the uplink data. Here, CG-UCI may be understood as UCI that relates to the CG mode of operation, but which doesn't exclusively carry information that relates to CG; for example, as described above, the CG-UCI may also carry COT sharing information.

In at least some embodiments, the uplink data transmission may be a URLLC data transmission, and wherein the information indicated by the one or more indicators of the CG-UCI is specific to URLLC transmissions. However, those skilled in the art would appreciate that embodiments of the present technique could be equally applied to transmissions other than URLLC transmissions, for example eMBB transmissions or unlicensed band transmissions (NR-U), and so the one or more new indicators in the CG-UCI may equally be used for the transmission of data related to services other than URLLC.

In at least some embodiments, each of the plurality of versions of CG-UCI indicate different control information, and wherein each of the plurality of instances of the sequence of instances of uplink communications resources of the wireless access interface associated with a version of the CG-UCI are associated with the same control information indicated by that version of the CG-UCI. Here, the control information may comprise one of a plurality of redundancy versions (RVs).

Essentially, such embodiments of the present technique as illustrated by the example of FIG. 17 propose that a PUSCH may be repeated consecutively for a number of repetitions within a longer set of PUSCH repetitions. The reliability of the CG-UCI coding may then be increased within that number of consecutive repetitions by repeating the CG-UCI within those PUSCH repetitions. It is necessary to repeat the CG-UCI within PUSCH repetitions having the same characteristics (e.g. RV), because there would otherwise be no benefit to the repetitions; CG-UCIs indicating different RVs or the like would not be combinable at the receiver (e.g. gNB) in order to increase the reliability of the CG-UCI. While RVs are described herein as the information within the CG-UCI that changes between PUSCH repetitions and thus requires repetition of CG-UCI within PUSCH repetitions, those skilled in the art would appreciate that this could be any field(s) within the CG-UCI other than (or in addition to) RV.

In at least some arrangements of embodiments of the present technique, the CG-UCI information may be repeated for $X_{UCIREP}$ units of physical resource. The PUSCH that is associated with the CG-UCI has the same characteristic (where the "characteristic" includes HPN, RV, NDI and COT Sharing Information) for those $X_{UCIREP}$ repetitions.

Figure 18:
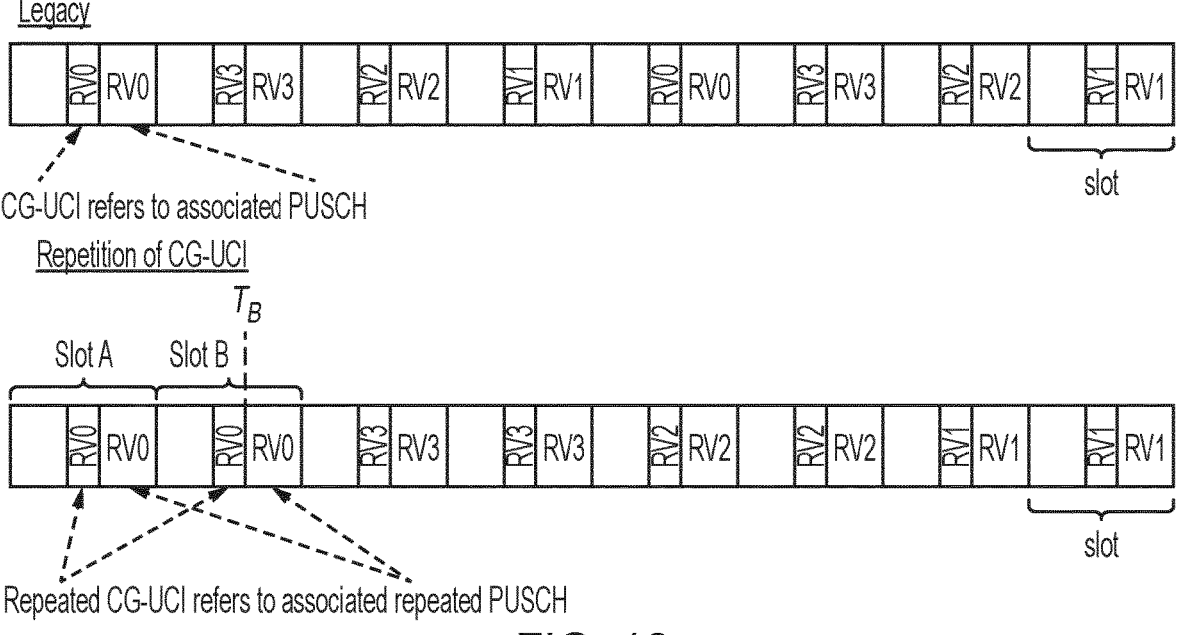
FIG. 18 shows an example of how Configured Grant Uplink Control Information (CG-UCI) may be repeated within a PUSCH in accordance with embodiments of the present technique.

For example, the CG-UCI is repeated for $X_{UCIREP}$ slots and the PUSCH is also repeated for those $X_{UCIREP}$ slots. In an example implementation as shown in FIG. 18, $X_{UCIREP}=2$ for a PUSCH with K=8 repetitions, although those skilled in the art would appreciate that $X_{UCIREP}$ could be greater than 2 and indeed this may increase reliability of the CG-UCI but at the cost of increased overhead and latency. For example, the $1^{st}$ and $2^{nd}$ repetitions use RV=0, $3^{rd}$ and $4^{th}$ repetitions use RV=3, $5^{th}$ and $6^{th}$ repetitions use RV=2 and $7^{th}$ and $8^{th}$ repetitions use RV=1.

In some arrangements of embodiments of the present technique, the unit of physical resource is a timeslot. In other words, the one or more transmitted versions of CG-UCI are each repeated one or more times within a plurality of time-divided slots of the wireless access interface, wherein each of the time-divided slots contains one of the two or more instances carrying the repetitions of the uplink data. This mode of operation is shown in FIG. 18.

In some other arrangements of embodiments of the present technique, the unit of physical resource is a sub-slot. In other words, the one or more transmitted versions of CG-UCI are each repeated one or more times within a plurality of time-divided sub-slots of the wireless access interface, wherein each of the time-divided sub-slots contains one of the two or more instances carrying the repetitions of the uplink data. In such arrangements, the PUSCH occupies a sub-slot, where the sub-slot can for example have a duration of 7 OFDM symbols, and the CG-UCI occupies OFDM symbols within the sub-slot. This mode of operation is similar to the arrangements described above with respect to FIG. 18; the difference being that the time axis is enumerated in units of sub-slot rather than in units of slot.

It will be evident from FIG. 18 that the gNB needs to receive and buffer multiple timeslots before it is able to decode the PUSCH. For example, with reference to FIG. 18, the gNB needs to buffer the first timeslot and the second timeslot before it is able to decode the CG-UCI and hence decode the PUSCH. i.e. in order to process the PUSCH repetition RV0 (repeated across slots A and B), the gNB needs to receive the CG-UCI in both slots A and B (and combine the CG-UCI in slots A and B). Once it has received the CG-UCI that is repeated across slots A and B, the gNB can determine that RV0 had been used to encode the PUSCH in slots A and B and hence perform physical channel processing of the PUSCH that is repeated across slots A and B. Hence, in this example, the gNB can start physical channel processing of the PUSCH received in slots A and B at time $T_B$. The gNB will have had to buffer the PUSCH across slots A and B until $T_B$, after which the gNB would know how to perform physical channel processing of the buffered PUSCH. Here, it should be noted that physical channel processing entails functions such as determining which parity and systematic bits are contained in the PUSCH and the interleaver pattern applied to the PUSCH physical channel bits.

In some other arrangements of embodiments of the present technique, the unit of physical resource is a Transmission Occasion. In other words, the one or more transmitted versions of CG-UCI are each repeated one or more times within one or more of the sequence of instances of uplink communications resources of the wireless access interface.

Figure 19:
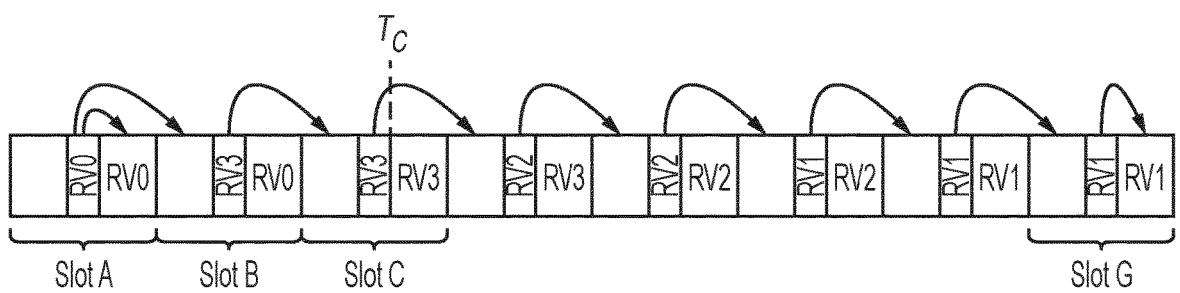
FIG. 19 shows an example of how CG-UCI may be repeated within a PUSCH with an offset in time in accordance with embodiments of the present technique.

The gNB buffering requirement described above can be averted if the repetitions of the CG-UCI are staggered with respect to the PUSCH to which they refer, as illustrated in FIG. 19. FIG. 19 shows:

Slot A—CG-UCI indicates RV0. This CG-UCI applies to the PUSCH in both slot A and slot B. It should be noted that this CG-UCI is not repeated and hence there is no repetition gain for CG-UCI in this slot. Since there is no repetition gain of CG-UCI in this slot, the performance of PUSCH decoding in slot A and slot B may be compromised. This is unlikely to be a severe problem (the CG-UCI will be decoded correctly most of the time and even if it isn't, it is likely that the PUSCH could be successfully decoded based on the other 6 slots: slots C→G);

Slot B—CG-UCI in slot B indicates the RV (etc.) that is applied in slot C;

Slot C—CG-UCI in slot C is the same as that in slot B and hence the CG-UCIs in slots B and C can be combined. The PUSCH in slots C and D can start to be decoded from time $T_C$, since the gNB is aware of the RV that is applied in slots C and D at time $T_C$, based on the repetition-decoded CG-UCI from slots B and C; and Slot G—The CG-UCI in slot G relates to the PUSCH in slot G. As an alternative, the CG-UCI in slot G can relate to the first PUSCH of a subsequent set of repeated PUSCH (i.e. the CG-UCI in slot G can relate to the PUSCH in "slot A" of a subsequent set of 8 repeated PUSCH).

Thus, as is shown by the example of FIG. 19, at least one CG-UCI repetition of at least one of the transmitted versions of CG-UCI is included earlier in time during the transmission of the uplink data than an earliest of the two or more instances associated with the at least one of the transmitted versions of CG-UCI.

Figures 20, 21:
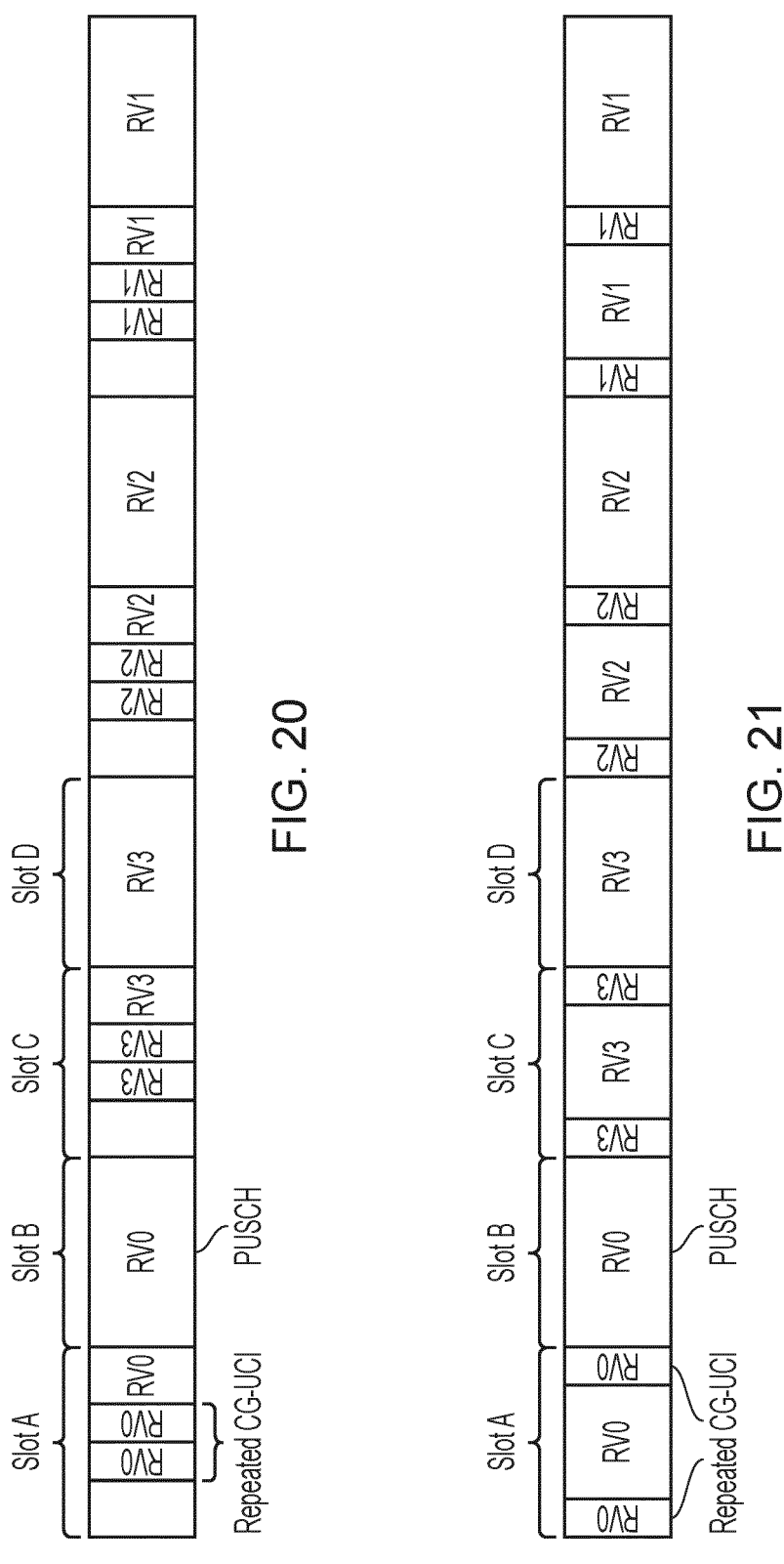
FIG. 20 shows an example of how CG-UCI repetitions may be within the first PUSCH repetition of a set of PUSCH repetitions that have the same RV in accordance with embodiments of the present technique.
FIG. 21 shows an example of how CG-UCI repetitions may occupy the starting and ending Orthogonal Frequency Division Multiplexing (OFDM) symbols of a PUSCH repetition in accordance with embodiments of the present technique.

The CG-UCI repetitions can occur within the first repetition of a set of PUSCH repetitions that are all encoded with the same RV. In this case, the gNB can reliably repetition decode the CG-UCI within the first PUSCH repetition and then repetition decode the following PUSCH repetitions that are all encoded with the same RV. In other words, all CG-UCI repetitions of at least one of the transmitted versions of CG-UCI are included in an earliest of the two or more instances associated with the at least one of the transmitted versions of CG-UCI. An example of such arrangements is shown in FIG. 20. FIG. 20 shows:

Slot A—This is the first slot of a pair (of two) PUSCH that are both encoded using RV0. Hence this slot contains two repetitions of a CG-UCI that indicate RV0. Once the gNB has decoded these repeated CG-UCI, it reliably knows the RV that it should use for decoding the PUSCH in both slot A and slot B;

Slot B—This is not the first slot of a pair of PUSCH repetitions that share the same RV, hence this slot does not contain CG-UCI; and Slot C—As for Slot A, although RV3 is applied to the PUSCH repetitions in slot C and slot D, hence the repeated CG-UCI indicates RV3;

Etc.

In some arrangements of embodiments of the present technique, the CG-UCI repetitions occur within the central portion of a PUSCH repetition when the RV changes (as shown in FIG. 20). In other words, all CG-UCI repetitions of the at least one of the transmitted versions of CG-UCI are located substantially in the middle of the earliest of the two or more instances associated with the at least one of the transmitted versions of CG-UCI.

FIG. 20 shows CG-UCI repetitions being repeated within the middle of a PUSCH repetition, but a those skilled in the art would appreciate that the CG-UCI repetitions could alternatively be located within other parts of the PUSCH repetition. An example is shown in FIG. 21, where the CG-UCI repetitions are located in the start and end symbols (OFDM symbols or SC-FDMA symbols) of a slot containing a PUSCH repetition.

In some other arrangements of embodiments of the present technique, the CG-UCI repetitions occur within the first and last symbols (OFDM or SC-FDMA) of a PUSCH repetition when the RV changes (as shown in FIG. 21). In other words, all CG-UCI repetitions of the at least one of the transmitted versions of CG-UCI are located substantially in at least one end of the earliest of the two or more instances associated with the at least one of the transmitted versions of CG-UCI.

In some other arrangements of embodiments of the present technique, the PUSCH is transmitted together with a CG-UCI within a restricted number of OFDM or SC-FDMA symbols and an additional CG-UCI is transmitted within other OFDM or SC-FDMA symbols. In other words, a first CG-UCI repetition of the at least one of the transmitted versions of CG-UCI is located within the earliest one of the two or more instances associated with the at least one of the transmitted versions of CG-UCI, and a second CG-UCI repetition of the at least one of the transmitted versions of CG-UCI is located subsequently in time to the earliest one of the two or more instances associated with the at least one of the transmitted versions of CG-UCI (i.e. outside of the CG-PUSCH resources, for example, directly afterwards). For example, the gNB configures the UE with a 12 OFDM symbol PUSCH that contains within it a 2 OFDM symbol CG-UCI, where the 12 OFDM symbols start at the first OFDM symbol of the slot. This arrangement can be configured using existing Rel-16 PUSCH configuration signaling. The UE is further configured with a CG-UCI transmission within the last two OFDM symbols, where this CG-UCI carries identical control information to that contained within the previously configured CG-UCI. The gNB can hence combine the two CG-UCI. This example has the benefit of minimizing specification changes and simplifies implementation.

In an alternative example, the repeated CG-UCI may be transmitted earlier than the earliest one of the two or more instances associated with the at least one of the transmitted versions of CG-UCI. In other words, a first CG-UCI repetition of the at least one of the transmitted versions of CG-UCI is located within the earliest one of the two or more instances associated with the at least one of the transmitted versions of CG-UCI, and a second CG-UCI repetition of the at least one of the transmitted versions of CG-UCI is located earlier in time than the earliest one of the two or more instances associated with the at least one of the transmitted versions of CG-UCI. For example, the gNB configures the UE with a 12 OFDM symbol PUSCH that contains within it a 2 OFDM symbol CG-UCI, where the 12 OFDM symbols start at the $3^{rd}$ OFDM symbol of the slot. This arrangement can be configured using existing Rel-16 PUSCH configuration signaling. The UE is further configured with a CG-UCI transmission within the first two OFDM symbols, where this CG-UCI carries identical control information to that contained within the previously configured CG-UCI. The gNB can hence combine the two CG-UCI.

Generally, in such arrangements of embodiments of the present technique as described above with respect to FIGS. 20 and 21, the CG-UCI repetitions occur within some known positions within a PUSCH repetition in which the RV changes. In other words, all CG-UCI repetitions of all of the one or more transmitted versions of CG-UCI are located in a position of the earliest of the two or more instances associated with the at least one of the transmitted versions of CG-UCI known to the wireless communications network.

In some arrangements of embodiments of the present technique, the CG-UCI repetitions can occur within the first PUSCH repetition (or first few repetitions) and subsequent PUSCH repetitions do not carry CG-UCI or carry fewer information bits within the CG-UCI. In other words, all CG-UCI repetitions of all of the transmitted versions of CG-UCI are included in an earliest of the two or more instances.

Figures 22, 23:
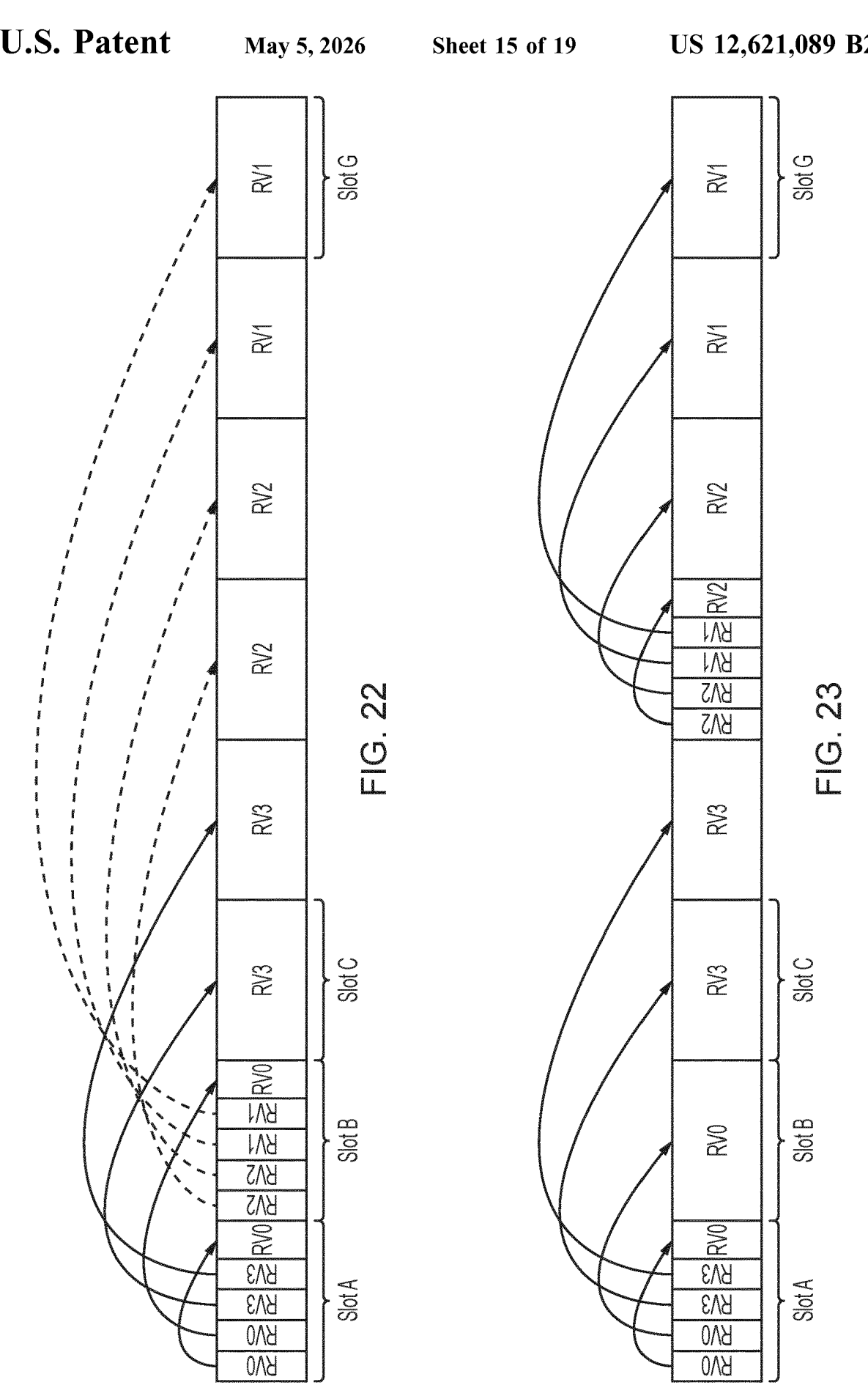
FIG. 22 shows an example of how CG-UCI may be repeated within an early PUSCH repetition in accordance with embodiments of the present technique.
FIG. 23 shows an example of how CG-UCI may be repeated in two different parts of a set of PUSCH repetitions in accordance with embodiments of the present technique.

Such arrangements allow the gNB to benefit from the repetition decoding gain of the CG-UCI and don't require the gNB to buffer PUSCHs. FIG. 22 shows an example of operation of such arrangements, where the CG-UCI for all PUSCH repetitions are sent within the first two slots of a PUSCH that is 8 timeslots in length. Since the gNB receives the CG-UCI early, it can repetition decode the CG-UCI before buffering the associated PUSCH. FIG. 22 shows:

Slot A—CG-UCI indicating RV0 are repeated twice. The associated PUSCH repetitions are transmitted in slots A and B. It should be noted that these PUSCH are significantly truncated through transmission of the CG-UCI. However, note that the total amount of resource available for PUSCH resource elements is the same as in FIG. 18; in FIG. 22, the location of the CG-UCI has changed, but the overall proportion of resource used by CG-UCI is the same;

Slot A—CG-UCI indicating RV3 are repeated twice. The associated PUSCH are transmitted in slots C and D; and Slot C and D—PUSCH with RV3 is transmitted in slot C and repeated in slot D;

Etc.

An alternative arrangement of embodiments of the present technique is shown in FIG. 23. FIG. 23 shows that a cluster of repeated CG-UCI may be transmitted at the start of a set of PUSCH repetitions and a second cluster is sent at a later time within the set of PUSCH repetitions. In other words, all CG-UCI repetitions of one or more of the transmitted versions of CG-UCI are included in an earliest of the two or more instances, and all CG-UCI repetitions of the others of the transmitted versions of CG-UCI are included in at least one later instance of the two or more instances. This arrangement avoids the situation where one of the PUSCH redundancy versions is significantly adversely affected, for example due to channel fading during the transmission of that PUSCH redundancy version.

While the above-described arrangements of embodiments of the present technique have described and demonstrated how the reliability of CG-UCI can be increased when a PUSCH is repeated through repetition of the CG-UCI, it is necessary for the UE to know where the boundaries of the new CG-UCI should be within the PUSCH repetitions. It is proposed that the CG-UCI is repeated in known PUSCH repetitions or follows a predefined order. In other words, the one or more transmitted versions of CG-UCI are each repeated one or more times within at least one of the two or more instances, the at least one of the two or more instances being known to the wireless communications network. Alternatively (or in addition), the one or more transmitted versions of CG-UCI are each repeated one or more times within at least one of the two or more instances in accordance with a predefined pattern, the predefined pattern being known to the wireless communications network.

An implementation of the said known PUSCH repetition or predefined order is that the CG-UCI is repeated in two consecutive PUSCH repetitions starting from the first PUSCH repetition; e.g. if PUSCH has 4 repetitions, the $1^{st}$ and $2^{nd}$ repetitions have the same CG-UCI and the $3^{rd}$ and $4^{th}$ repetitions have the same CG-UCI, but the CG-UCI in the $3^{rd}$ and $4^{th}$ repetitions may be different to that in the $1^{st}$ & $2^{nd}$ repetition. Here the gNB can then combine the CG-UCI in the $1^{st}$ & $2^{nd}$ repetition and the $3^{rd}$ with the $4^{th}$ repetition. An example of the predefined order is that every odd numbered repetition has the same CG-UCI.

The said predefined order or known PUSCH repetition where CG-UCI is repeated can be RRC configured, signalled in an activation DCI or fixed in the specifications. That is, the at least one of the two or more instances and/or the predefined pattern are configured by Radio Resource Control, RRC, signalling received by the communications device from the wireless communications network. Alternatively (or in addition), the at least one of the two or more instances and/or the predefined pattern are indicated in Downlink Control Information, DCI, received by the communications device from the wireless communications network, the DCI indicating that the sequence of instances of uplink communications resources of the wireless access interface are active and may be used by the communications device to transmit signals to the wireless communications network. Alternatively (or in addition), the at least one of the two or more instances and/or the predefined pattern are predetermined and known to both the communications device and the infrastructure equipment.

Figure 24:
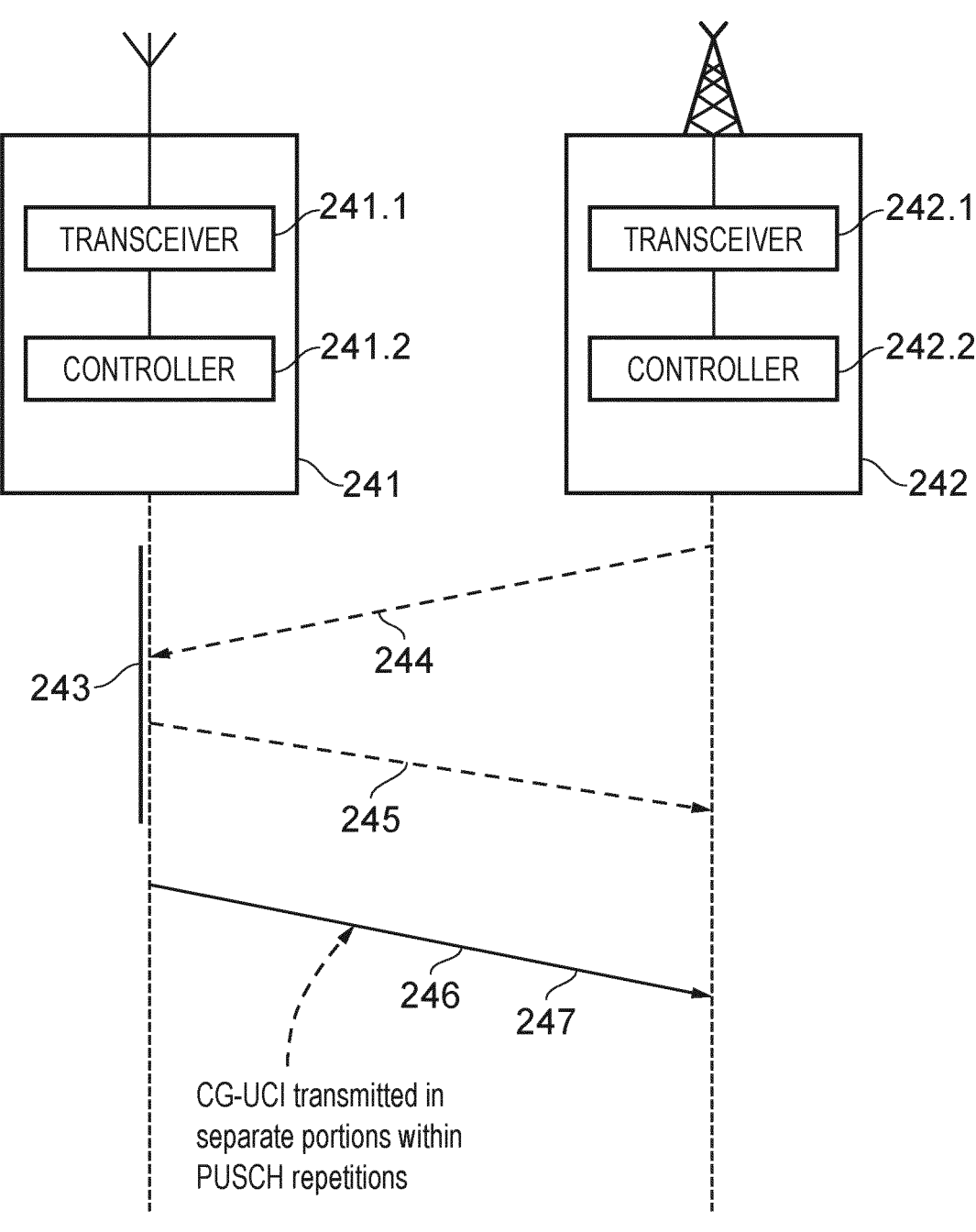
FIG. 24 shows a second part schematic, part message flow diagram representation of a wireless communications network comprising a communications device and an infrastructure equipment in accordance with embodiments of the present technique.

FIG. 24 shows a part schematic, part message flow diagram representation of a wireless communications network comprising a communications device 241 and an infrastructure equipment 242 in accordance with at least some embodiments of the present technique. The communications device 241 is configured to transmit data to or receive data from the wireless communications network, for example, to and from the infrastructure equipment 242, via a wireless access interface provided by the wireless communications network. Specifically, the communications device 242 may be configured to transmit data (for example, Ultra Reliable Low Latency Communications (URLLC) data) to the wireless communications network (e.g. to the infrastructure equipment 242) via the wireless access interface. The communications device 241 and the infrastructure equipment 242 each comprise a transceiver (or transceiver circuitry) 241.1, 242.1, and a controller (or controller circuitry) 241.2, 242.2. Each of the controllers 241.2, 242.2 may be, for example, a microprocessor, a CPU, or a dedicated chipset, etc.

As shown in the example of FIG. 24, the transceiver circuitry 241.1 and the controller circuitry 241.2 of the communications device 241 are configured in combination, to operate 243 in accordance with a configured grant (CG) mode of operation, the CG mode of operation comprising the communications device 241 being configured to determine 244 (e.g. via an activation indication or other such command received from the wireless communications network, such as from infrastructure equipment 242) a sequence of instances of uplink communications resources of the wireless access interface, and to transmit 245 signals to the wireless communications network (for example, to the infrastructure equipment 242) in at least one instance of the sequence of instances of uplink communications resources 45 of the wireless access interface, to transmit 246 uplink data, to the wireless communications network (for example, from the infrastructure equipment 242), in two or more instances of the sequence of instances of uplink communications resources of the wireless access interface as a plurality of repetitions of the uplink data (where each instance may comprise one or more repetitions of the same PUSCH), and to transmit 247 one or more of a plurality of versions of uplink control information, CG-UCI, to the wireless communications network (for example, from the infrastructure equipment 242), each version of CG-UCI being associated with a plurality of instances of the sequence of instances of uplink communications resources of the wireless access interface. Here, the communications device 241 is configured to transmit 246, 247 the uplink data and the CG-UCI such that the one or more transmitted versions of CG-UCI are each transmitted 247 as two or more separate portions, each of the two or more portions being transmitted 247 within different instances of the two or more instances during the transmission 246 of the uplink data.

Essentially, such embodiments of the present technique as illustrated by the example of FIG. 24 propose that a PUSCH may be repeated consecutively for a number of repetitions within a longer set of PUSCH repetitions. The reliability of the CG-UCI coding may then be increased within that number of consecutive repetitions by decreasing the number of bits within the CG-UCI through including portions of the CG-UCI in different places within the repetitions, thus reducing the code rate of the CG-UCI.

In such embodiments of the present technique, when repetitions are applied (or more specifically, when more than a threshold number of repetitions are applied), the CG-UCI may be sub-divided (or partitioned, or segmented) and transmitted within separate PUSCH repetitions. The sub-divided CG-UCI are hence compact UCI compared to the original CG-UCI.

In an example, the CG-UCI consists of {HPN, RV, NDI, COT sharing information}. At a low number of PUSCH repetitions, these information fields are transmitted within a single CG-UCI and within a single PUSCH. At a larger number of repetitions (e.g. when the number of PUSCH repetitions is higher than a threshold), the information bits are split into two CG-UCI:

CG-UCI1={HPN, RV}; and

CG-UCI2={NDI, COT sharing information}.

Figure 25:
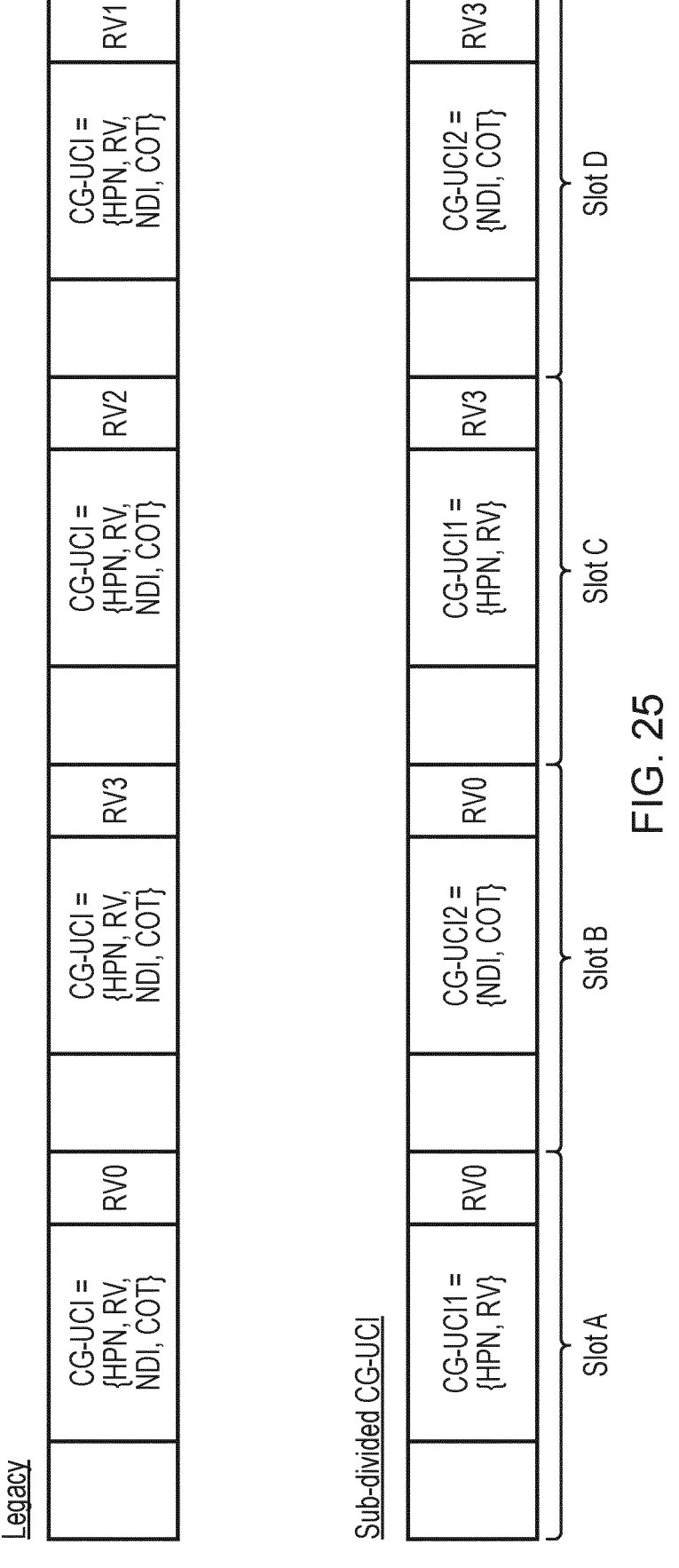
FIG. 25 shows an example of sub-divided CG-UCI in accordance with embodiments of the present technique.

The split CG-UCI are then transmitted within different PUSCH repetitions. An example is shown in FIG. 25 (it should be noted here that the time extent of the CG-UCI is exaggerated in FIG. 25 for ease of understanding). FIG. 25 shows the following:

In the legacy case, each PUSCH repetition contains a CG-UCI that contains a full set of uplink control information ({HPN, RV, NDI, COT sharing information});

In accordance with the above-described arrangements of embodiments of the present technique as described with respect to FIG. 24, half of the CG-UCI information is transmitted within one PUSCH repetition and half of the CG-UCI information is transmitted within another PUSCH repetition:

Slot A—CG-UCI1 is transmitted and signals {HPN, RV}. This information is applicable for both slots A and B. The HPN and RV are needed for decoding the PUSCH and hence it is preferable that these fields are transmitted within CG-UCI1 rather than CG-UCI2;

Slot B—CG-UCI2 is transmitted and signals {NDI, COT sharing information}.

Slot C. Similar to slot A, but this information is applicable to slots C and D. It should be noted here that the uplink control information transmitted in slot C can be different to that transmitted in slot A; and Slot D—Similar to slot B. Note that the uplink control information transmitted in slot D can be different to that transmitted in slot B.

Those skilled in the art would appreciate that since the number of information bits per CG-UCI has been reduced, while the number of physical bits used to transmit the CG-UCI remains the same, the reliability of the uplink control information is increased (i.e. CG-UCI1, which contains half the number of information bits as CG-UCI, transmitted without repetition, is expected to have the same reliability as/similar reliability to CG-UCI with two repetitions. In both cases, the effective code rate is the same).

It should be appreciated that, with respect to the embodiments of the present technique as described with respect to FIGS. 24 and 25, different aspects of the CG-UCI can be updated/changed at different times. For example, the RV can be updated in slot A or slot C while the COT sharing information can be updated at slot B or slot D.

Those skilled in the art would appreciate that operation of a UE (or communications device) as described with respect to FIGS. 24 and 25 could be combined with the operation of a UE as described with respect to FIGS. 17 to 23; that is a UE may transmit repetitions of portions of CG-UCI within PUSCH repetitions comprising uplink data. Those skilled in the art would understand that any embodiment or example as disclosed herein with respect either to the embodiments described by way of FIGS. 17 to 23 or to the embodiments described by way of FIGS. 24 and 25 is able to be combined with any other.

While the above-described arrangements of embodiments of the present technique have described and demonstrated how the reliability of CG-UCI can be increased when a PUSCH is repeated through segmentation of the CG-UCI, it is necessary for the UE to know where the boundaries of the new CG-UCI should be within the PUSCH repetitions. It is proposed that the first sub-divided portion of a CG-UCI is transmitted in known PUSCH repetitions or follows a pre-defined order. In other words, the different instances of the two or more instances containing the two or more separate portions are known to the wireless communications network. Alternatively (or in addition), the two or more separate portions are transmitted within the different instances of the two or more instances in accordance with a predefined pattern, the predefined pattern being known to the wireless communications network.

For example, an implementation of the said known PUSCH repetition or predefined order is that CG-UCI1 is transmitted in the $1^{st}$ PUSCH repetition and CG-UCI2 is transmitted in the $2^{nd}$ PUSCH repetition. The $3^{rd}$ PUSCH repetition contains a CG-UCI1, where this CG-UCI1 may have different contents to the CG-UCI1 in the $1^{st}$ PUSCH repetition and the $4^{th}$ repetition contains a CG-UCI2, where this CG-UCI2 may have different contents to the CG-UCI2 in the $2^{nd}$ PUSCH repetition. An example of the predefined order is that odd numbered PUSCH repetitions carry CG-UCI1 and odd numbered PUSCH repetitions carry CG-UCI2.

The said predefined order or known PUSCH repetition where CG-UCI is repeated can be RRC configured, signalled in an activation DCI or fixed in the specifications. That is, the different instances of the two or more instances and/or the predefined pattern are configured by Radio Resource Control, RRC, signalling received by the communications device from the wireless communications network. Alternatively (or in addition), the different instances of the two or more instances and/or the predefined pattern are indicated in Downlink Control Information, DCI, received by the communications device from the wireless communications network, the DCI indicating that the sequence of instances of uplink communications resources of the wireless access interface are active and may be used by the communications device to transmit signals to the wireless communications network. Alternatively (or in addition), the different instances of the two or more instances and/or the predefined pattern are predetermined and known to both the communications device and the infrastructure equipment.

Flow Chart Representation

Figure 26:
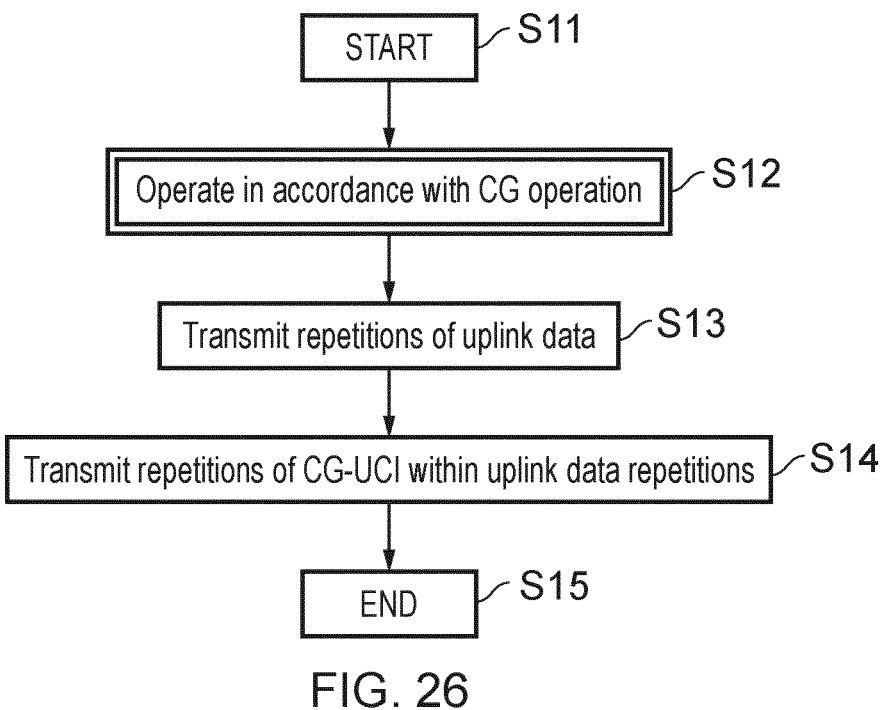
FIG. 26 shows a flow diagram illustrating a first process of communications in a communications system in accordance with embodiments of the present technique.

FIG. 26 shows a flow diagram illustrating a first example process of communications in a communications system in accordance with embodiments of the present technique. The process shown by FIG. 26 is a method of operating a communications device configured to transmit data to a wireless communications network (e.g. to an infrastructure equipment) via a wireless access interface.

The method begins in step S11. The method comprises, in step S12, operating in accordance with a configured grant (CG) mode of operation. In step S13, the process comprises transmitting uplink data to the wireless communications network in two or more instances of the sequence of instances of uplink communications resources of the wireless access interface as a plurality of repetitions of the uplink data. In step S14, the method comprises transmitting one or more of a plurality of versions of uplink control information, CG-UCI, to the wireless communications network, each version of CG-UCI being associated with a plurality of instances of the sequence of instances of uplink communications resources of the wireless access interface. Here, the one or more transmitted versions of CG-UCI are each repeated a plurality of times during the transmission of the uplink data. The process ends in step S15.

Figure 27:
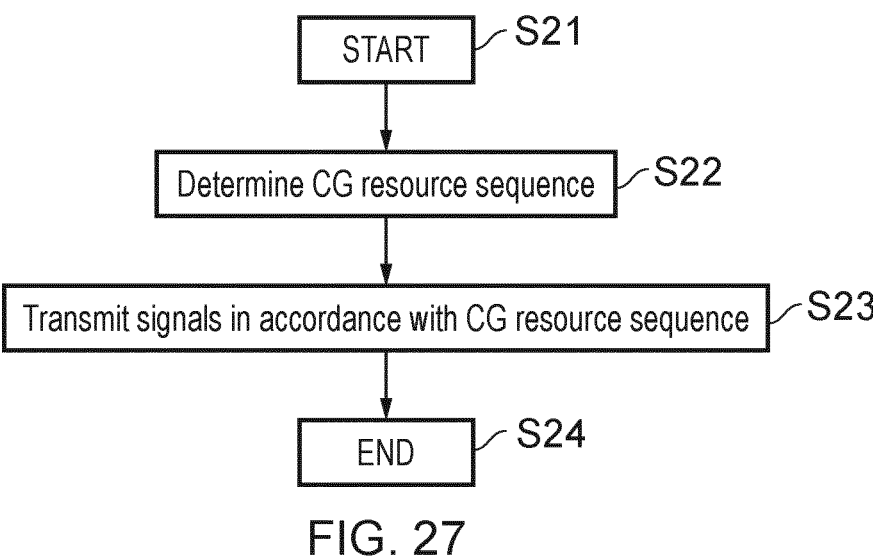
FIG. 27 shows a flow diagram illustrating a second process of communications in a communications system in accordance with embodiments of the present technique.

FIG. 27 shows a flow diagram illustrating a second example process of communications in a communications system in accordance with embodiments of the present technique. The process shown by FIG. 27 specifies more in-depth operation of a communications device operating in accordance with a configured grant (CG) mode of operation such as the CG mode of operation as referred to in step S12 of the method illustrated by FIG. 26.

The method begins in step S21. The method comprises, in step S22, determining a sequence of instances of uplink communications resources of a wireless access interface (e.g. through reception of an activation (or other) indication or a command defining such a sequence from a wireless communications network, for example from an infrastructure equipment of the wireless communications network). In step S23, the method comprises transmitting signals to the wireless communications network in at least one instance of the sequence of instances of uplink communications resources of the wireless access interface. The process ends in step S24.

Figure 28:
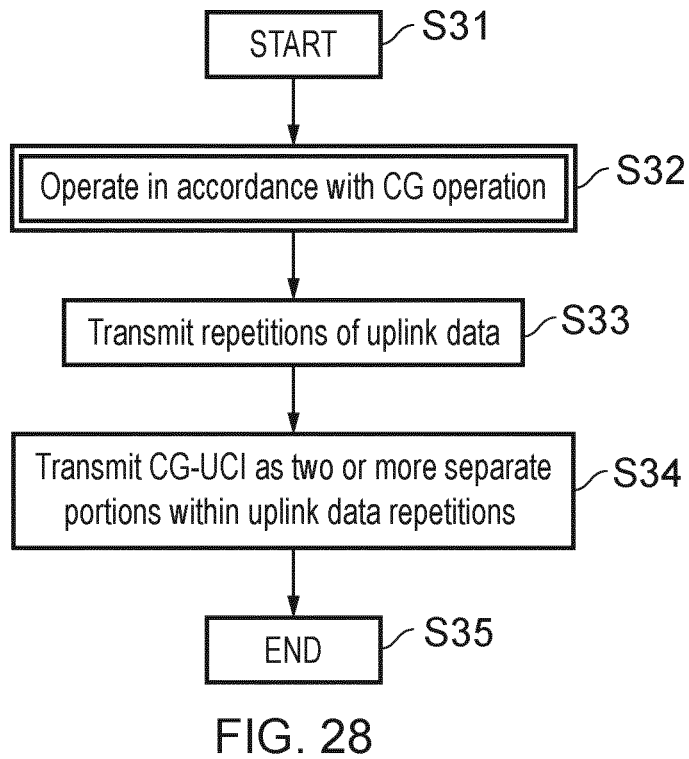
FIG. 28 shows a flow diagram illustrating a third process of communications in a communications system in accordance with embodiments of the present technique.

FIG. 28 shows a flow diagram illustrating a third example process of communications in a communications system in accordance with embodiments of the present technique. The process shown by FIG. 28 is a method of operating a communications device configured to transmit data to a wireless communications network (e.g. to an infrastructure equipment) via a wireless access interface.

The method begins in step S31. The method comprises, in step S32, operating in accordance with a configured grant (CG) mode of operation (again, here, FIG. 27 specifies more in-depth details of a communications device operating in accordance with a configured grant (CG) mode of operation such as the CG mode of operation as referred to here in step S32 of the method illustrated by FIG. 28). In step S33, the process comprises transmitting uplink data to the wireless communications network in two or more instances of the sequence of instances of uplink communications resources of the wireless access interface as a plurality of repetitions of the uplink data. In step S34, the method comprises transmitting one or more of a plurality of versions of uplink control information, CG-UCI, to the wireless communications network, each version of CG-UCI being associated with a plurality of instances of the sequence of instances of uplink communications resources of the wireless access interface. Here, the one or more transmitted versions of CG-UCI are each transmitted as two or more separate portions, each of the two or more portions being transmitted within different instances of the two or more instances during the transmission of the uplink data. The process ends in step S35.

Those skilled in the art would appreciate that the methods shown by FIGS. 26, 27, and 28 may be adapted in accordance with embodiments of the present technique. For example, other intermediate steps may be included in either or both of these methods, or the steps may be performed in any logical order.

Though embodiments of the present technique have been described largely by way of the example communications system shown in FIGS. 17 and 24, and described with respect to the examples in FIGS. 18 to 23 and 25, it would be clear to those skilled in the art that they could be equally applied to other systems to those described herein.

Whilst embodiments of the present technique have been largely described with respect to uplink CG resources, and uplink control information relating to such resources, those skilled in the art would appreciate that embodiments of the present technique could be correspondingly applied to any kind of resources in the uplink, downlink, or sidelink. For example, downlink control information (DCI) may be transmitted in accordance with repetitions or segmentation as herein-described within PDSCH repetitions in the downlink within semi-persistent scheduling (SPS) resources or the like where such DCI may change between PDSCH repetitions. Such applications of the described embodiments, with respect to uplink downlink, and sidelink communications, are within the scope of the present disclosure.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device configured to transmit data to a wireless communications network via a wireless access interface, the method comprising operating in accordance with a configured grant, CG, mode of operation, the CG mode of operation comprising determining a sequence of instances of uplink communications resources of the wireless access interface and transmitting signals to the wireless communications network in at least one instance of the sequence of instances of uplink communications resources of the wireless access interface, transmitting uplink data to the wireless communications network in two or more instances of the sequence of instances of uplink communications resources of the wireless access interface as a plurality of repetitions of the uplink data, and transmitting one or more of a plurality of versions of uplink control information, CG-UCI, to the wireless communications network, each version of CG-UCI being associated with a plurality of instances of the sequence of instances of uplink communications resources of the wireless access interface, wherein the one or more transmitted versions of CG-UCI are each repeated a plurality of times during the transmission of the uplink data.

Paragraph 2. A method according to Paragraph 1, wherein each of the plurality of versions of CG-UCI indicate different control information, and wherein each of the plurality of instances of the sequence of instances of uplink communications resources of the wireless access interface associated with a version of the CG-UCI are associated with the same control information indicated by that version of the CG-UCI.

Paragraph 3. A method according to Paragraph 2, wherein the control information indicates one of a plurality of redundancy versions.

Paragraph 4. A method according to any of Paragraphs 1 to 3, wherein the one or more transmitted versions of CG-UCI are each repeated one or more times within a plurality of time-divided slots of the wireless access interface, wherein each of the time-divided slots contains one of the two or more instances carrying the repetitions of the uplink data.

Paragraph 5. A method according to any of Paragraphs 1 to 4, wherein the one or more transmitted versions of CG-UCI are each repeated one or more times within a plurality of time-divided sub-slots of the wireless access interface, wherein each of the time-divided sub-slots contains one of the two or more instances carrying the repetitions of the uplink data.

Paragraph 6. A method according to any of Paragraphs 1 to 5, wherein the one or more transmitted versions of CG-UCI are each repeated one or more times within one or more of the sequence of instances of uplink communications resources of the wireless access interface.

Paragraph 7. A method according to any of Paragraphs 1 to 6, wherein at least one CG-UCI repetition of at least one of the transmitted versions of CG-UCI is included earlier in time during the transmission of the uplink data than an earliest of the two or more instances associated with the at least one of the transmitted versions of CG-UCI.

Paragraph 8. A method according to any of Paragraphs 1 to 7, wherein all CG-UCI repetitions of at least one of the transmitted versions of CG-UCI are included in an earliest one of the two or more instances associated with the at least one of the transmitted versions of CG-UCI.

Paragraph 9. A method according to Paragraph 8, wherein all CG-UCI repetitions of the at least one of the transmitted versions of CG-UCI are located substantially in the middle of the earliest one of the two or more instances associated with the at least one of the transmitted versions of CG-UCI.

Paragraph 10. A method according to Paragraph 8 or Paragraph 9, wherein all CG-UCI repetitions of the at least one of the transmitted versions of CG-UCI are located substantially in at least one end of the earliest one of the two or more instances associated with the at least one of the transmitted versions of CG-UCI.

Paragraph 11. A method according to any of Paragraphs 8 to 10, wherein a first CG-UCI repetition of the at least one of the transmitted versions of CG-UCI is located within the earliest one of the two or more instances associated with the at least one of the transmitted versions of CG-UCI, and a second CG-UCI repetition of the at least one of the transmitted versions of CG-UCI is located subsequently in time to the earliest one of the two or more instances associated with the at least one of the transmitted versions of CG-UCI.

Paragraph 12. A method according to any of Paragraphs 8 to 11, wherein a first CG-UCI repetition of the at least one of the transmitted versions of CG-UCI is located within the earliest one of the two or more instances associated with the at least one of the transmitted versions of CG-UCI, and a second CG-UCI repetition of the at least one of the transmitted versions of CG-UCI is located earlier in time than the earliest one of the two or more instances associated with the at least one of the transmitted versions of CG-UCI.

Paragraph 13. A method according to any of Paragraphs 8 to 12, wherein all CG-UCI repetitions of all of the one or more transmitted versions of CG-UCI are located in a position of the earliest one of the two or more instances associated with the at least one of the transmitted versions of CG-UCI known to the wireless communications network.

Paragraph 14. A method according to any of Paragraphs 1 to 13, wherein all CG-UCI repetitions of all of the transmitted versions of CG-UCI are included in an earliest of the two or more instances.

Paragraph 15. A method according to any of Paragraphs 1 to 14, wherein all CG-UCI repetitions of one or more of the transmitted versions of CG-UCI are included in an earliest of the two or more instances, and all CG-UCI repetitions of the others of the transmitted versions of CG-UCI are included in at least one later instance of the two or more instances.

Paragraph 16. A method according to any of Paragraphs 1 to 15, wherein the one or more transmitted versions of CG-UCI are each repeated one or more times within at least one of the two or more instances, the at least one of the two or more instances being known to the wireless communications network.

Paragraph 17. A method according to any of Paragraphs 1 to 16, wherein the one or more transmitted versions of CG-UCI are each repeated one or more times within at least one of the two or more instances in accordance with a predefined pattern, the predefined pattern being known to the wireless communications network.

Paragraph 18. A method according to Paragraph 16 or Paragraph 17, wherein the at least one of the two or more instances and/or the predefined pattern are configured by Radio Resource Control, RRC, signalling received by the communications device from the wireless communications network.

Paragraph 19. A method according to any of Paragraphs 16 to 18, wherein the at least one of the two or more instances and/or the predefined pattern are indicated in Downlink Control Information, DCI, received by the communications device from the wireless communications network, the DCI indicating that the sequence of instances of uplink communications resources of the wireless access interface are active and may be used by the communications device to transmit signals to the wireless communications network.

Paragraph 20. A method according to any of Paragraphs 16 to 19, wherein the at least one of the two or more instances and/or the predefined pattern are predetermined and known to both the communications device and the infrastructure equipment.

Paragraph 21. A method according to any of Paragraphs 1 to 20, wherein the one or more transmitted versions of CG-UCI are each transmitted as two or more separate portions, each of the two or more portions being transmitted within different instances of the two or more instances during the transmission of the uplink data.

Paragraph 22. A communications device configured to transmit data to a wireless communications network via a wireless access interface, the communications device comprising transceiver circuitry configured to transmit signals and receive signals via a wireless access interface, and controller circuitry configured in combination with the transceiver circuitry to operate in accordance with a configured grant, CG, mode of operation, the CG mode of operation comprising the communications device being configured to determine a sequence of instances of uplink communications resources of the wireless access interface and to transmit signals to the wireless communications network in at least one instance of the sequence of instances of uplink communications resources of the wireless access interface, to transmit uplink data to the wireless communications network in two or more instances of the sequence of instances of uplink communications resources of the wireless access interface as a plurality of repetitions of the uplink data, and to transmit one or more of a plurality of versions of uplink control information, CG-UCI, to the wireless communications network, each version of CG-UCI being associated with a plurality of instances of the sequence of instances of uplink communications resources of the wireless access interface, wherein the one or more transmitted versions of CG-UCI are each repeated a plurality of times during the transmission of the uplink data.

Paragraph 23. Circuitry for a communications configured to transmit data to a wireless communications network via a wireless access interface, the circuitry comprising transceiver circuitry configured to transmit signals and receive signals via a wireless access interface, and controller circuitry configured in combination with the transceiver circuitry to operate in accordance with a configured grant, CG, mode of operation, the CG mode of operation comprising the circuitry being configured to determine a sequence of instances of uplink communications resources of the wireless access interface and to transmit signals to the wireless communications network in at least one instance of the sequence of instances of uplink communications resources of the wireless access interface, to transmit uplink data to the wireless communications network in two or more instances of the sequence of instances of uplink communications resources of the wireless access interface as a plurality of repetitions of the uplink data, and to transmit one or more of a plurality of versions of uplink control information, CG-UCI, to the wireless communications network, each version of CG-UCI being associated with a plurality of instances of the sequence of instances of uplink communications resources of the wireless access interface, wherein the one or more transmitted versions of CG-UCI are each repeated a plurality of times during the transmission of the uplink data.

Paragraph 24. A method of operating an infrastructure equipment forming part of a wireless communications network configured to receive data from a communications device via a wireless access interface, the method comprising transmitting, to the communications device, an indication that the communications device is configured to operate in accordance with a configured grant, CG, mode of operation, the CG mode of operation comprising, at the communications device, determining a sequence of instances of uplink communications resources of the wireless access interface and transmitting signals to the infrastructure equipment in at least one instance of the sequence of instances of uplink communications resources of the wireless access interface, receiving uplink data from the communications device in two or more instances of the sequence of instances of uplink communications resources of the wireless access interface as a plurality of repetitions of the uplink data, and receiving one or more of a plurality of versions of uplink control, CG-UCI, from the communications device, each version of CG-UCI being associated with a plurality of instances of the sequence of instances of uplink communications resources of the wireless access interface, wherein the one or more received versions of CG-UCI are each repeated a plurality of times during transmission of the uplink data.

Paragraph 25. A method according to Paragraph 24, wherein each of the plurality of versions of CG-UCI indicate different control information, and wherein each of the plurality of instances of the sequence of instances of uplink communications resources of the wireless access interface associated with a version of the CG-UCI are associated with the same control information indicated by that version of the CG-UCI.

Paragraph 26. A method according to Paragraph 25, wherein the control information indicates one of a plurality of redundancy versions Paragraph 27. A method according to any of Paragraphs 24 to 26, wherein the one or more received versions of CG-UCI are each repeated one or more times within a plurality of time-divided slots of the wireless access interface, wherein each of the time-divided slots contains one of the two or more instances carrying the repetitions of the uplink data.

Paragraph 28. A method according to any of Paragraphs 24 to 27, wherein the one or more received versions of CG-UCI are each repeated one or more times within a plurality of time-divided sub-slots of the wireless access interface, wherein each of the time-divided sub-slots contains one of the two or more instances carrying the repetitions of the uplink data.

Paragraph 29. A method according to any of Paragraphs 24 to 28, wherein the one or more received versions of CG-UCI are each repeated one or more times within one or more of the sequence of instances of uplink communications resources of the wireless access interface.

Paragraph 30. A method according to any of Paragraphs 24 to 29, wherein at least one CG-UCI repetition of at least one of the received versions of CG-UCI is included earlier in time during the transmission of the uplink data than an earliest of the two or more instances associated with the at least one of the received versions of CG-UCI.

Paragraph 31. A method according to any of Paragraphs 24 to 30, wherein all CG-UCI repetitions of at least one of the received versions of CG-UCI are included in an earliest of the two or more instances associated with the at least one of the received versions of CG-UCI.

Paragraph 32. A method according to Paragraph 31, wherein all CG-UCI repetitions of the at least one of the received versions of CG-UCI are located substantially in the middle of the earliest of the two or more instances associated with the at least one of the received versions of CG-UCI.

Paragraph 33. A method according to Paragraph 31 or Paragraph 32, wherein all CG-UCI repetitions of the at least one of the received versions of CG-UCI are located substantially in at least one end of the earliest of the two or more instances associated with the at least one of the received versions of CG-UCI.

Paragraph 34. A method according to any of Paragraphs 31 to 33, wherein a first CG-UCI repetition of the at least one of the received versions of CG-UCI is located within the earliest one of the two or more instances associated with the at least one of the received versions of CG-UCI, and a second CG-UCI repetition of the at least one of the received versions of CG-UCI is located subsequently in time to the earliest one of the two or more instances associated with the at least one of the received versions of CG-UCI.

Paragraph 35. A method according to any of Paragraphs 31 to 34, wherein a first CG-UCI repetition of the at least one of the received versions of CG-UCI is located within the earliest one of the two or more instances associated with the at least one of the received versions of CG-UCI, and a second CG-UCI repetition of the at least one of the received versions of CG-UCI is located earlier in time than the earliest one of the two or more instances associated with the at least one of the received versions of CG-UCI.

Paragraph 36. A method according to any of Paragraphs 31 to 35, wherein all CG-UCI repetitions of all of the one or more received versions of CG-UCI are located in a position of the earliest of the two or more instances associated with the at least one of the received versions of CG-UCI known to the infrastructure equipment.

Paragraph 37. A method according to any of Paragraphs 24 to 36, wherein all CG-UCI repetitions of all of the received versions of CG-UCI are included in an earliest of the two or more instances.

Paragraph 38. A method according to any of Paragraphs 24 to 37, wherein all CG-UCI repetitions of one or more of the received versions of CG-UCI are included in an earliest of the two or more instances, and all CG-UCI repetitions of the others of the received versions of CG-UCI are included in at least one later instance of the two or more instances.

Paragraph 39. A method according to any of Paragraphs 24 to 38, wherein the one or more received versions of CG-UCI are each repeated one or more times within at least one of the two or more instances, the at least one of the two or more instances being known to the infrastructure equipment.

Paragraph 40. A method according to any of Paragraphs 24 to 39, wherein the one or more received versions of CG-UCI are each repeated one or more times within at least one of the two or more instances in accordance with a predefined pattern, the predefined pattern being known to the infrastructure equipment.

Paragraph 41. A method according to Paragraph 39 or Paragraph 40, wherein the at least one of the two or more instances and/or the predefined pattern are configured by Radio Resource Control, RRC, signalling transmitted by the infrastructure equipment to the communications device.

Paragraph 42. A method according to any of Paragraphs 39 to 41, wherein the at least one of the two or more instances and/or the predefined pattern are indicated in Downlink Control Information, DCI, transmitted by the infrastructure equipment to the communications device, the DCI indicating that the sequence of instances of uplink communications resources of the wireless access interface are active and may be used by the communications device to transmit signals to the infrastructure equipment.

Paragraph 43. A method according to any of Paragraphs 39 to 42, wherein the at least one of the two or more instances and/or the predefined pattern are predetermined and known to both the communications device and the infrastructure equipment.

Paragraph 44. A method according to any of Paragraphs 24 to 43, wherein the one or more transmitted versions of CG-UCI are each received as two or more separate portions, each of the two or more portions being received within different instances of the two or more instances during transmission of the uplink data.

Paragraph 45. An infrastructure equipment forming part of a wireless communications network configured to receive data from a communications device via a wireless access interface, the infrastructure equipment comprising transceiver circuitry configured to transmit signals and receive signals via a wireless access interface provided by the infrastructure equipment, and controller circuitry configured in combination with the transceiver circuitry to transmit, to the communications device, an indication that the communications device is configured to operate in accordance with a configured grant, CG, mode of operation, the CG mode of operation comprising, at the communications device, determining a sequence of instances of uplink communications resources of the wireless access interface and transmitting signals to the infrastructure equipment in at least one instance of the sequence of instances of uplink communications resources of the wireless access interface, to receive uplink data from the communications device in two or more instances of the sequence of instances of uplink communications resources of the wireless access interface as a plurality of repetitions of the uplink data, and to receive one or more of a plurality of versions of uplink control information, CG-UCI, from the communications device, each version of CG-UCI being associated with a plurality of instances of the sequence of instances of uplink communications resources of the wireless access interface, wherein the one or more received versions of CG-UCI are each repeated a plurality of times during transmission of the uplink data.

Paragraph 46. Circuitry for an infrastructure equipment forming part of a wireless communications network configured to receive data from a communications device via a wireless access interface, the circuitry comprising transceiver circuitry configured to transmit signals and receive signals via a wireless access interface provided by the circuitry, and controller circuitry configured in combination with the transceiver circuitry to transmit, to the communications device, an indication that the communications device is configured to operate in accordance with a configured grant, CG, mode of operation, the CG mode of operation comprising, at the communications device, determining a sequence of instances of uplink communications resources of the wireless access interface and transmitting signals to the circuitry in at least one instance of the sequence of instances of uplink communications resources of the wireless access interface, to receive uplink data from the communications device in two or more instances of the sequence of instances of uplink communications resources of the wireless access interface as a plurality of repetitions of the uplink data, and to receive one or more of a plurality of versions of uplink control information, CG-UCI, from the communications device, each version of CG-UCI being associated with a plurality of instances of the sequence of instances of uplink communications resources of the wireless access interface, wherein the one or more received versions of CG-UCI are each repeated a plurality of times during transmission of the uplink data.

Paragraph 47. A method of operating a communications device configured to transmit data to a wireless communications network via a wireless access interface, the method comprising operating in accordance with a configured grant, CG, mode of operation, the CG mode of operation comprising determining a sequence of instances of uplink communications resources of the wireless access interface and transmitting signals to the wireless communications network in at least one instance of the sequence of instances of uplink communications resources of the wireless access interface, transmitting uplink data to the wireless communications network in two or more instances of the sequence of instances of uplink communications resources of the wireless access interface as a plurality of repetitions of the uplink data, and transmitting one or more of a plurality of versions of uplink control information, CG-UCI, to the wireless communications network, each version of CG-UCI being associated with a plurality of instances of the sequence of instances of uplink communications resources of the wireless access interface, wherein the one or more transmitted versions of CG-UCI are each transmitted as two or more separate portions, each of the two or more portions being transmitted within different instances of the two or more instances during the transmission of the uplink data.

Paragraph 48. A method according to Paragraph 47, wherein the different instances of the two or more instances containing the two or more separate portions are known to the wireless communications network.

Paragraph 49. A method according to Paragraph 47 or Paragraph 48, wherein the two or more separate portions are transmitted within the different instances of the two or more instances in accordance with a predefined pattern, the predefined pattern being known to the wireless communications network.

Paragraph 50. A method according to Paragraph 48 or Paragraph 49, wherein the different instances of the two or more instances and/or the predefined pattern are configured by Radio Resource Control, RRC, signalling received by the communications device from the wireless communications network.

Paragraph 51. A method according to any of Paragraphs 48 to 50, wherein the different instances of the two or more instances and/or the predefined pattern are indicated in Downlink Control Information, DCI, received by the communications device from the wireless communications network, the DCI indicating that the sequence of instances of uplink communications resources of the wireless access interface are active and may be used by the communications device to transmit signals to the wireless communications network.

Paragraph 52. A method according to any of Paragraphs 48 to 51, wherein the different instances of the two or more instances and/or the predefined pattern are predetermined and known to both the communications device and the infrastructure equipment.

Paragraph 53. A communications device configured to transmit data to a wireless communications network via a wireless access interface, the communications device comprising transceiver circuitry configured to transmit signals and receive signals via a wireless access interface, and controller circuitry configured in combination with the transceiver circuitry to operate in accordance with a configured grant, CG, mode of operation, the CG mode of operation comprising the communications device being configured to determine a sequence of instances of uplink communications resources of the wireless access interface and to transmit signals to the wireless communications network in at least one instance of the sequence of instances of uplink communications resources of the wireless access interface, to transmit uplink data to the wireless communications network in two or more instances of the sequence of instances of uplink communications resources of the wireless access interface as a plurality of repetitions of the uplink data, and to transmit one or more of a plurality of versions of uplink control, CG-UCI, to the wireless communications network, each version of CG-UCI being associated with a plurality of instances of the sequence of instances of uplink communications resources of the wireless access interface, wherein the one or more transmitted versions of CG-UCI are each transmitted as two or more separate portions, each of the two or more portions being transmitted within different instances of the two or more instances during the transmission of the uplink data.

Paragraph 54. Circuitry for a communications configured to transmit data to a wireless communications network via a wireless access interface, the circuitry comprising transceiver circuitry configured to transmit signals and receive signals via a wireless access interface, and controller circuitry configured in combination with the transceiver circuitry to operate in accordance with a configured grant, CG, mode of operation, the CG mode of operation comprising the circuitry being configured to determine a sequence of instances of uplink communications resources of the wireless access interface and to transmit signals to the wireless communications network in at least one instance of the sequence of instances of uplink communications resources of the wireless access interface, to transmit uplink data to the wireless communications network in two or more instances of the sequence of instances of uplink communications resources of the wireless access interface as a plurality of repetitions of the uplink data, and to transmit one or more of a plurality of versions of uplink control information, CG-UCI, to the wireless communications network, each version of CG-UCI being associated with a plurality of instances of the sequence of instances of uplink communications resources of the wireless access interface, wherein the one or more transmitted versions of CG-UCI are each transmitted as two or more separate portions, each of the two or more portions being transmitted within different instances of the two or more instances during the transmission of the uplink data.

Paragraph 55. A method of operating an infrastructure equipment forming part of a wireless communications network configured to receive data from a communications device via a wireless access interface, the method comprising transmitting, to the communications device, an indication that the communications device is configured to operate in accordance with a configured grant, CG, mode of operation, the CG mode of operation comprising, at the communications device, determining a sequence of instances of uplink communications resources of the wireless access interface and transmitting signals to the infrastructure equipment in at least one instance of the sequence of instances of uplink communications resources of the wireless access interface, receiving uplink data from the communications device in two or more instances of the sequence of instances of uplink communications resources of the wireless access interface as a plurality of repetitions of the uplink data, and receiving one or more of a plurality of versions of uplink control, CG-UCI, from the communications device, each version of CG-UCI being associated with a plurality of instances of the sequence of instances of uplink communications resources of the wireless access interface, wherein the one or more transmitted versions of CG-UCI are each received as two or more separate portions, each of the two or more portions being received within different instances of the two or more instances during transmission of the uplink data.

Paragraph 56. A method according to Paragraph 55, wherein the different instances of the two or more instances containing the two or more separate portions are known to the infrastructure equipment.

Paragraph 57. A method according to Paragraph 55 or Paragraph 56, wherein the two or more separate portions are received within the different instances of the two or more instances in accordance with a predefined pattern, the predefined pattern being known to the infrastructure equipment.

Paragraph 58. A method according to Paragraph 56 or Paragraph 57, wherein the different instances of the two or more instances and/or the predefined pattern are configured by Radio Resource Control, RRC, signalling transmitted by the infrastructure equipment to the communications device.

Paragraph 59. A method according to any of Paragraphs 56 to 58, wherein the different instances of the two or more instances and/or the predefined pattern are indicated in Downlink Control Information, DCI, transmitted by the infrastructure equipment to the communications device, the DCI indicating that the sequence of instances of uplink communications resources of the wireless access interface are active and may be used by the communications device to transmit signals to the infrastructure equipment.

Paragraph 60. A method according to any of Paragraphs 56 to 59, wherein the different instances of the two or more instances and/or the predefined pattern are predetermined and known to both the communications device and the infrastructure equipment.

Paragraph 61. An infrastructure equipment forming part of a wireless communications network configured to receive data from a communications device via a wireless access interface, the infrastructure equipment comprising transceiver circuitry configured to transmit signals and receive signals via a wireless access interface provided by the infrastructure equipment, and controller circuitry configured in combination with the transceiver circuitry to transmit, to the communications device, an indication that the communications device is configured to operate in accordance with a configured grant, CG, mode of operation, the CG mode of operation comprising, at the communications device, determining a sequence of instances of uplink communications resources of the wireless access interface and transmitting signals to the infrastructure equipment in at least one instance of the sequence of instances of uplink communications resources of the wireless access interface, to receive uplink data from the communications device in two or more instances of the sequence of instances of uplink communications resources of the wireless access interface as a plurality of repetitions of the uplink data, and to receive one or more of a plurality of versions of uplink control, CG-UCI, from the communications device, each version of CG-UCI being associated with a plurality of instances of the sequence of instances of uplink communications resources of the wireless access interface, wherein the one or more transmitted versions of CG-UCI are each received as two or more separate portions, each of the two or more portions being received within different instances of the two or more instances during transmission of the uplink data.

Paragraph 62. Circuitry for an infrastructure equipment forming part of a wireless communications network configured to receive data from a communications device via a wireless access interface, the circuitry comprising transceiver circuitry configured to transmit signals and receive signals via a wireless access interface provided by the circuitry, and controller circuitry configured in combination with the transceiver circuitry to transmit, to the communications device, an indication that the communications device is configured to operate in accordance with a configured grant, CG, mode of operation, the CG mode of operation comprising, at the communications device, determining a sequence of instances of uplink communications resources of the wireless access interface and transmitting signals to the circuitry in at least one instance of the sequence of instances of uplink communications resources of the wireless access interface, to receive uplink data from the communications device in two or more instances of the sequence of instances of uplink communications resources of the wireless access interface as a plurality of repetitions of the uplink data, and to receive one or more of a plurality of versions of uplink control, CG-UCI, from the communications device, each version of CG-UCI being associated with a plurality of instances of the sequence of instances of uplink communications resources of the wireless access interface, wherein the one or more transmitted versions of CG-UCI are each received as two or more separate portions, each of the two or more portions being received within different instances of the two or more instances during transmission of the uplink data.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] TR 38.913, "Study on Scenarios and Requirements for Next Generation Access Technologies (Release 14)", third Generation Partnership Project, v14.3.0.

[3] RP-190726, "Physical layer enhancements for NR ultra-reliable and low latency communication (URLLC)", Huawei, HiSilicon, RAN#83.

[4] RP-201310, "Revised WID: Enhanced Industrial Internet of Things (IoT) and ultra-reliable and low latency communication (URLLC) support for NR," Nokia, Nokia Shanghai Bell, RAN#88e.

[5] RP-191575, "NR-based Access to Unlicensed Spectrum," Qualcomm, RAN#84.

[6] European patent application number EP20187799.0.

[7] TS 38.321, "NR: Medium Access Control (MAC) protocol specification (Release 16)," v16.1.0.

[8] TS 38.212, "NR: Multiplexing and channel coding (Release 16)," v16.1.0.

What is claimed is:

1. A method of operating a communications device configured to transmit data to a wireless communications network via a wireless access interface, the method comprising:

operating in accordance with a configured grant (CG) mode of operation, the CG mode of operation comprising determining a sequence of instances of uplink communications resources of the wireless access interface and transmitting signals to the wireless communications network in at least one instance of the sequence of instances of uplink communications resources of the wireless access interface, transmitting uplink data to the wireless communications network in two or more instances of the sequence of instances of uplink communications resources of the wireless access interface as a plurality of repetitions of the uplink data, and transmitting one or more of a plurality of versions of uplink control information (CG-UCI) to the wireless communications network, each version of CG-UCI being associated with a plurality of instances of the sequence of instances of uplink communications resources of the wireless access interface, wherein the one or more transmitted versions of CG-UCI are each repeated a plurality of times during the transmission of the uplink data, and wherein all CG-UCI repetitions of one or more of the transmitted versions of CG-UCI are included in an earliest of the two or more instances, and all CG-UCI repetitions of the others of the transmitted versions of CG-UCI are included in at least one later instance of the two or more instances.

2. The method according to claim 1, wherein each of the plurality of versions of CG-UCI indicate different control information, and wherein each of the plurality of instances of the sequence of instances of uplink communications resources of the wireless access interface associated with a version of the CG-UCI are associated with the same control information indicated by that version of the CG-UCI.

3. The method according to claim 2, wherein the control information indicates one of a plurality of redundancy versions.

4. The method according to claim 1, wherein the one or more transmitted versions of CG-UCI are each repeated one or more times within a plurality of time-divided slots of the wireless access interface, wherein each of the time-divided slots contains one of the two or more instances carrying the repetitions of the uplink data.

5. The method according to claim 1, wherein the one or more transmitted versions of CG-UCI are each repeated one or more times within a plurality of time-divided sub-slots of the wireless access interface, wherein each of the time-divided sub-slots contains one of the two or more instances carrying the repetitions of the uplink data.

6. The method according to claim 1, wherein the one or more transmitted versions of CG-UCI are each repeated one or more times within one or more of the sequence of instances of uplink communications resources of the wireless access interface.

7. The method according to claim 1, wherein at least one CG-UCI repetition of at least one of the transmitted versions of CG-UCI is included earlier in time during the transmission of the uplink data than an earliest of the two or more instances associated with the at least one of the transmitted versions of CG-UCI.

8. The method according to claim 1, wherein all CG-UCI repetitions of at least one of the transmitted versions of CG-UCI are included in an earliest one of the two or more instances associated with the at least one of the transmitted versions of CG-UCI.

9. The method according to claim 8, wherein all CG-UCI repetitions of the at least one of the transmitted versions of CG-UCI are located substantially in the middle of the earliest one of the two or more instances associated with the at least one of the transmitted versions of CG-UCI.

10. The method according to claim 8, wherein all CG-UCI repetitions of the at least one of the transmitted versions of CG-UCI are located substantially in at least one end of the earliest one of the two or more instances associated with the at least one of the transmitted versions of CG-UCI.

11. The method according to claim 8, wherein a first CG-UCI repetition of the at least one of the transmitted versions of CG-UCI is located within the earliest one of the two or more instances associated with the at least one of the transmitted versions of CG-UCI, and a second CG-UCI repetition of the at least one of the transmitted versions of CG-UCI is located subsequently in time to the earliest one of the two or more instances associated with the at least one of the transmitted versions of CG-UCI.

12. The method according to claim 8, wherein a first CG-UCI repetition of the at least one of the transmitted versions of CG-UCI is located within the earliest one of the two or more instances associated with the at least one of the transmitted versions of CG-UCI, and a second CG-UCI repetition of the at least one of the transmitted versions of CG-UCI is located earlier in time than the earliest one of the two or more instances associated with the at least one of the transmitted versions of CG-UCI.

13. The method according to claim 8, wherein all CG-UCI repetitions of all of the one or more transmitted versions of CG-UCI are located in a position of the earliest one of the two or more instances associated with the at least one of the transmitted versions of CG-UCI known to the wireless communications network.

14. The method according to claim 1, wherein all CG-UCI repetitions of all of the transmitted versions of CG-UCI are included in an earliest of the two or more instances.

15. The method according to claim 1, wherein the one or more transmitted versions of CG-UCI are each repeated one or more times within at least one of the two or more instances, the at least one of the two or more instances being known to the wireless communications network.

16. The method according to claim 1, wherein the one or more transmitted versions of CG-UCI are each repeated one or more times within at least one of the two or more instances in accordance with a predefined pattern, the predefined pattern being known to the wireless communications network.

17. The method according to claim 1, wherein the one or more transmitted versions of CG-UCI are each transmitted as two or more separate portions, each of the two or more portions being transmitted within different instances of the two or more instances during the transmission of the uplink data.

18. A communications device configured to transmit data to a wireless communications network via a wireless access interface, the communications device comprising:

transceiver circuitry configured to transmit signals and receive signals via a wireless access interface, and controller circuitry configured in combination with the transceiver circuitry to operate in accordance with a configured grant (CG) mode of operation, the CG mode of operation comprising the communications device being configured to determine a sequence of instances of uplink communications resources of the wireless access interface and to transmit signals to the wireless communications network in at least one instance of the sequence of instances of uplink communications resources of the wireless access interface, to transmit uplink data to the wireless communications network in two or more instances of the sequence of instances of uplink communications resources of the wireless access interface as a plurality of repetitions of the uplink data, and to transmit one or more of a plurality of versions of uplink control information (CG-UCI) to the wireless communications network, each version of CG-UCI being associated with a plurality of instances of the sequence of instances of uplink communications resources of the wireless access interface, wherein the one or more transmitted versions of CG-UCI are each repeated a plurality of times during the transmission of the uplink data, and wherein all CG-UCI repetitions of one or more of the transmitted versions of CG-UCI are included in an earliest of the two or more instances, and all CG-UCI repetitions of the others of the transmitted versions of CG-UCI are included in at least one later instance of the two or more instances.

19. An infrastructure equipment forming part of a wireless communications network configured to receive data from a communications device via a wireless access interface, the infrastructure equipment comprising:

transceiver circuitry configured to transmit signals and receive signals via a wireless access interface provided by the infrastructure equipment, and controller circuitry configured in combination with the transceiver circuitry to transmit, to the communications device, an indication that the communications device is configured to operate in accordance with a configured grant (CG) mode of operation, the CG mode of operation comprising, at the communications device, determining a sequence of instances of uplink communications resources of the wireless access interface and transmitting signals to the infrastructure equipment in at least one instance of the sequence of instances of uplink communications resources of the wireless access interface, to receive uplink data from the communications device in two or more instances of the sequence of instances of uplink communications resources of the wireless access interface as a plurality of repetitions of the uplink data, and to receive one or more of a plurality of versions of uplink control information (CG-UCI) from the communications device, each version of CG-UCI being associated with a plurality of instances of the sequence of instances of uplink communications resources of the wireless access interface, wherein the one or more received versions of CG-UCI are each repeated a plurality of times during transmission of the uplink data, and wherein all CG-UCI repetitions of one or more of the transmitted versions of CG-UCI are included in an earliest of the two or more instances, and all CG-UCI repetitions of the others of the transmitted versions of CG-UCI are included in at least one later instance of the two or more instances.

\* \* \* \* \*